(12) United States Patent
Ding et al.

(10) Patent No.: US 9,535,704 B2
(45) Date of Patent: Jan. 3, 2017

(54) SYSTEM AND METHOD TO QUANTIFY DIGITAL DATA SHARING IN A MULTI-THREADED EXECUTION

(71) Applicants: Chen Ding, Pittsford, NY (US); Hao Luo, Rochester, NY (US)

(72) Inventors: Chen Ding, Pittsford, NY (US); Hao Luo, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 14/613,066

(22) Filed: Feb. 3, 2015

(65) Prior Publication Data
US 2015/0242217 A1    Aug. 27, 2015

Related U.S. Application Data

(60) Provisional application No. 61/935,137, filed on Feb. 3, 2014.

(51) Int. Cl.
G06F 9/45    (2006.01)
G06F 9/38    (2006.01)
G06F 9/30    (2006.01)

(52) U.S. Cl.
CPC .......... G06F 9/3863 (2013.01); G06F 9/3001 (2013.01); G06F 9/30047 (2013.01)

(58) Field of Classification Search
None
See application file for complete search history.

(56) References Cited

U.S. PATENT DOCUMENTS

| | | | |
|---|---|---|---|
| 8,566,956 B2 * | 10/2013 | Slater | G06F 21/552 707/709 |
| 8,909,614 B2 * | 12/2014 | Kan | G06F 3/0625 707/705 |
| 9,117,030 B2 * | 8/2015 | Singhal | G06F 11/3696 |

OTHER PUBLICATIONS

Agarwal, Anant; Horowitz, Mark; Hennessy, John, "An Analytical Cache Model", 1989, vol. 7, No. 2, pp. 184-215. (32 pages).
Bennett, John K; Carter, John B.; Zwanepoel, Willy, "Adaptive Software Cache Management for Distributed Shared Memory Architectures", 1990. In Proceedings of ISCA, pp. 125-134. (10 pages).

(Continued)

*Primary Examiner* — Evral E Bodden
(74) *Attorney, Agent, or Firm* — Harris Beach PLLC

(57) ABSTRACT

A method to quantify a plurality of digital data sharing in a multi-threaded execution includes the steps of: providing at least one processor; providing a computer readable non-transitory storage medium including a computer readable multi-threaded executable code and a computer readable executable code to calculate a plurality of shared footprint values and an average shared footprint value; running the multi-threaded executable code on the at least one computer processor; running the computer readable executable code configured to calculate a plurality of shared footprint values and an average shared footprint value; calculating a plurality of shared footprint values by use of a linear-time process for a corresponding plurality of executable windows in time; and calculating and saving an average shared footprint value based on the plurality of shared footprint values to quantify by a metric the data sharing by the multi-threaded execution. A system to perform the method is also described.

19 Claims, 12 Drawing Sheets

(56) References Cited

OTHER PUBLICATIONS

Beyls, Kristof and D'Hollander, Erik H., "Discovery of Locality-Improving Refractorings by Reuse Path Analysis". 2006. In Proceedings of High Performance Computing and Communications. Springer-Verlag Berlin Heidelbeerg, vol. 4208, pp. 220-229. (10 pages).

Bienia, Christian; Kumar, Sanjeev, Singh, Jaswinder Pal; and Li, Kai. "The PARSEC Benchmark Suite: Characterization and Architectural Implications", 2008. In Proceedings of PACT, pp. 72-81. (22 pages).

Biena, Christian and Li, Kai, "Fidelity and Scaling of the PARSERC Benchmark Inputs", Dec. 2010. In Proceedings of the 2010 International Symposium on Workload Characterization. (10 pages).

Cascaval, Calin; Duesterwald, Evelyn; Sweeney, Peter F.; Wisniewski, Robert W., "Multiple Page Size Modeling and Optimization", 2005. In Proceedings of PACT, pp. 339-349. (11 pages).

Chandra, Dhruba; Guo, Fei; Kim, Seongboem; and Solihan, Yan, "Predicting Inter-Thread Cache Contention on a Chip Multi-Processor Architecture", 2005. In Proceedings of HPCA, pp. 340-351. (12 pages).

Cui, Huimin; Yi, Qing; Xue, Jingling; Wang, Lei; Yang, Yang; Feng, Xiaobing, "A Highly Parallel Reuse Distance Analysis Algorithm on GPUs", 2012. In Proceedings of IPDPS (13 pages).

Denning, Peter J., "Working Sets Past and Present". IEEE Transactions on Software Engineering, Jan. 1980. SE-6(1). (21 pages).

Denning, Peter J. and Schwartz, Stuart C., "Properties of the Working-Set Model", Mar. 1972. Communications of the ACM, vol. 15, No. 3, pp. 191-198. (8 pages).

Ding, Chen and Chilimbi, Trishul, "A Composable Model for Analyzing Locality of Mult-threaded Programs", Aug. 2009. Technical Report MSR-TR-2009-107, Microsoft Research. (18 pages).

Eklov, David; Black-Schaffer, David; and Hagersten, Erik, Fast Modeling of Shared Caches in Multicore Systems, 2011. In Proceedings of HiPEAC, pp. 147-157. (11 pages).

Falsafi, Babak and Wood, David A., "Modeling Cost/Performance of a Parallel Computer Simulator", Jan. 1997. ACM Transactions on Modeling and Computer Simulation, vol. 7, No. 1, pp. 104-130. (27 pages).

Gupta, Saurabh; Xiang, Ping; Yang, Yi; Zhou, Huiyang, "Locality Principle Revisited: A Probability-Based Quantitative Approach", 2012. In Proceedings of IPDPS. (15 pages).

Hill, Mark D. and Smith, Alan Jay, "Evaluating Associativity in CPU Caches", Dec. 1989. IEEE Transactions on Computers, vol. 38, No. 12, pp. 1612-1630. (19 pages).

Jiang, Yunlian; Tian, Kai; Shen, Xipeng, "Combining Locality Analysis with Online Proactive Job Co-Scheduling in Chip Multiprocessors", 2010. In Proceedings of HiPEAC, pp. 201-215. (15 pages).

Jiang, Yunlian; Zhang, Eddy Z; Tian, Kai; Shen, Xipeng, "Is Reuse Distance Applicable to Data Locality Analysis on Chip Multiprocessors?", 2010. In Proceedings of CC, pp. 264-282. (19 pages).

Luk, Chi-Keung; Cohn, Robert; Muth, Robert; Patil, Harish; Klauser, Artur; Lowney, Geoff; Wallace, Steven; Reddi, Vijay Janapa; Hazelwood, Kim; "Pin: Building Customized Program Analysis Tools with Dynamic Instrumentation", 2005. In Proceedings of PLDI, pp. 190-200. (11 pages).

Mattson, R. L. Slutz, D. R. and Traiger, I. L., "Evaluation techniques for storage hierarchies", 1970. IBM System Journal, 9(2), pp. 78-117 (40 pages).

Niu, Qingpeng; Dinan, James; Lu, Qingda, Sadayappan, P., "PARDA: A Fast Parallel Reuse Distance Analysis Algorithm", 2012. In Proceedings of IPDPS. (11 pages).

Pusukuri, Kishore Kumar; Gupta, Rajiv; Bhuyan, Laxmi N., "No More Backstabbing . . . A Faithful Scheduling Policy for Multithreaded Programs", 2011. In Proceedings of PACT, pp. 53-64. (10 pages).

Schuff, Derek L.; Kulkarni, Milind; and Pai, Vijay S. "Accelerating Multicore Reuse Distance Analysis with Sampling and Parallelization", 2010. In Proceedings of PACT, pp. 53-64. (11 pages).

Sen, Rathijit; Wood, David; "Reuse-based Online Models for Caches", 2013. In Proceedings of SIGMETRICS, pp. 279-292. (14 pages).

Smith, Alan Jay, "On the Effectiveness of Set Associative Page Mapping and its Application to Main Memory Management", 1976. In Proceedings of ICSE. (7 pages).

Suh, Ed; Devadas, Srinivas, Rudolph, Larry; "Analytical Cache Models with Application to Cache Partitioning", Jun. 2001. In Proceedings of ICS, pp. 1-12 (14 pages).

Tam, David K.; Azimi, Reza; Soares, Livio B.; Stumm, Michael; "RapidMRC: Approximating L2 Miss Rate Curves on Commodity Systems for Online Optimizations", 2009. In Proceedings of ASPLOS, pp. 121-132. (12 pages).

Thiebaut, Dominique; Stone, Harold S.; "Footprints in the Cache", Nov. 1987. ACM Transactions on Computer Systems, vol. 5, No. 4, pp. 305-329. (25 pages).

Woo, Steven Cameron; Ohara, Moriyoshi; Torrie, Evan; Singh, Jaswinder Pal; and Gupta, Anoop; "The Splash-2 Programs: Characterization and Methodological Considerations", 1995. The 22nd annual International Symposium on Computer Architecture, pp. 24-36. (13 pages).

Wu, Meng-Ju; Zhao, Minshu; and Yeung, Donald; "Studying Multicore Processor Scaling via Reuse Distance Analysis", 2013. In Proceedings of ISCA, pp. 499-510. (12 pages).

Wu, Meng-Ju and Yeung, Donald; "Coherent Profiles: Enabling Efficient Reuse Distance Analysis of Multicore Scaling for Loop-based Parallel Programs", Oct. 2011. In Proceedings of PACT, pp. 264-275. (12 pages).

Xiang, Ziaoya; Bao, Bin; Bai, Tongxin; Ding, Chen; Chilimbi, Trishul; "All-Window Profiling and Composable Models of Cache Sharing", Feb. 2011. In Proceedings of PPoPP, pp. 91-102. (11 pages).

Xiang, Xiaoya; Bao, Bin; Ding, Chen; Gao, Yaoqing; "Linear-time Modeling of Program Working Set in Shared Cache", 2011. In Proceedings of PACT, pp. 350-360. (11 pages).

Xiang, Xiaoya; Ding, Chen; Luo, Hao; Bao, Bin; "HOTL: A Higher Order Theory of Locality", Mar. 2013. In Proceedings of ASPLOS, pp. 343-356. (14 pages).

Zhong, Yutao; Chang, Wentao; "Sampling-based Program Locality Approximation", Jun. 2008. In Proceedings of ISMM, pp. 91-100. (10 pages).

Zhong, Yutao; Shen, Xipeng; and Ding, Chen; "Program Locality Analysis Using Reuse Distance", Aug. 2009. ACM Transactions on Programming Languages and Systems, vol. 31, No. 6, Article 20. (39 pages).

Zhou, Pin; Pandey, Vivek; Sundaresan, Jagadeesan; Raghuraman, Anand; Zhou, Yuanyuan; and Kumar, Sanjeev; "Dynamic Tracking of Page Miss Ratio Curve for Memory Management", Oct. 2004. In Proceedings of ASPLOS, pp. 177-188. (12 pages).

Intel Corporation, "Intel® 64 and IA-32 Architectures Software Developers Manual", Sep. 2013. Order No. 325462-048US. (4 pages).

Intel Corporation, "Intel® 64 and IA-32 Architectures Software Developers Manual," Apr. 2015. Order No. 325462-054US. (4 pages).

Eggers, Susan J. and Katz, Randy H., "A Characterization of Sharing n Parallel Programs and Its Applicability to Coherency Protocol Evaluation", Dec. 1987. In Proceedings of ISCA, pp. 373-382. (22 pages).

\* cited by examiner

|  | access locality | window locality |
|---|---|---|
| shared cache without data sharing | reuse distance (i.e. LRU statck distance), reuse time | footprint (i.e. working set in cache) |
| shared cache with data sharing | concurrent reuse distance | shared footprint (this work) |

| 4-thread groups | num. blocks shared |
|---|---|
| (2,3,4,6) | 230370 |
| (2,3,5,6) | 237970 |
| (2,3,5,7) | 245929 |
| (2,3,4,7) | 255371 |
| (1,3,5,6) | 494763 |
| (1,3,4,6) | 496758 |
| (1,3,5,7) | 507269 |
| (1,3,4,7) | 518241 |

FIG. 3B

```
// threads 1,2
for i from 0 to 1
    create_thread;

// threads 4,5
for i from 0 to 1
    create_thread;

// threads 6,7
for i from 0 to 1
    create_thread;

// thread 3
create_thread;
```

FIG. 3A

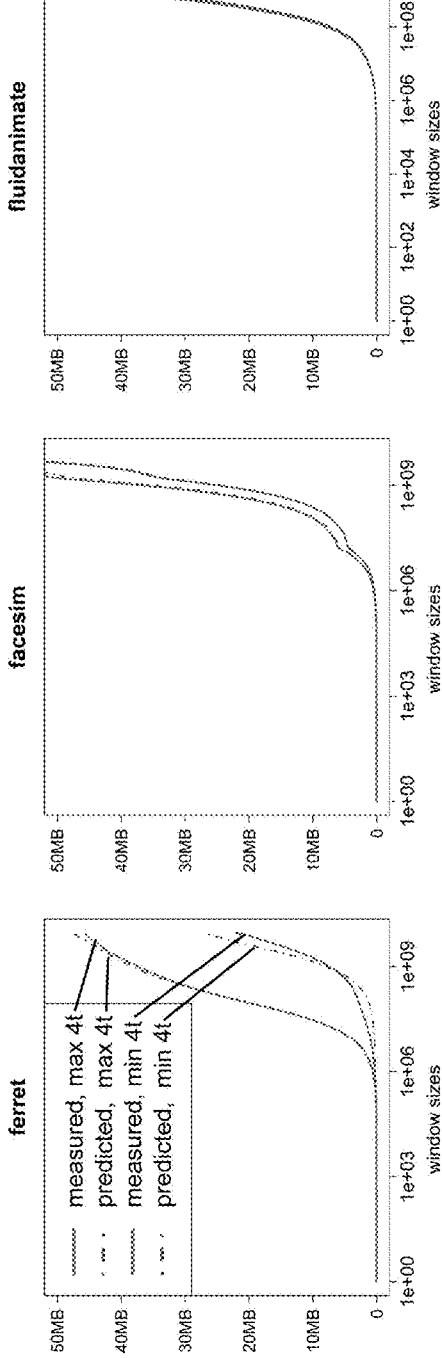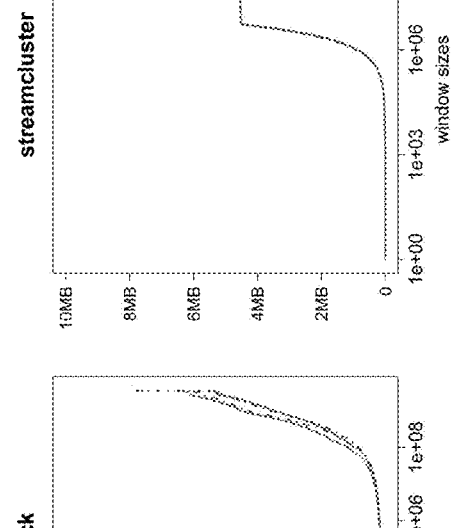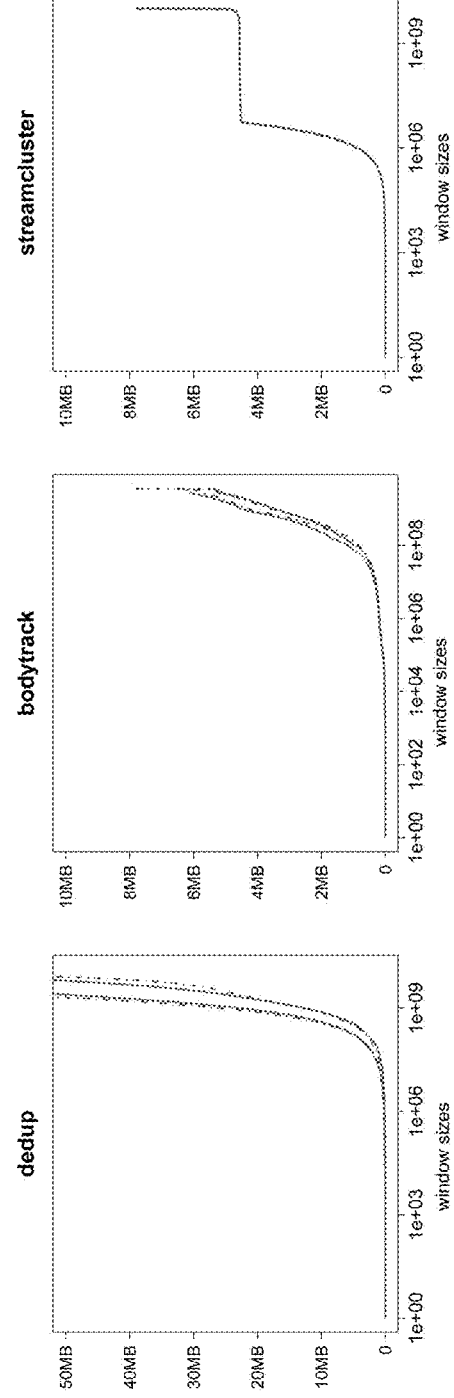

SYSTEM AND METHOD TO QUANTIFY DIGITAL DATA SHARING IN A MULTI-THREADED EXECUTION

CROSS-REFERENCE TO RELATED APPLICATIONS

This application claims priority to and the benefit of U.S. provisional patent application Ser. No. 61/935,137, SYSTEM AND METHOD TO QUANTIFY DIGITAL DATA SHARING IN A MULTI-THREADED EXECUTION, filed Feb. 3, 2014, which application is incorporated herein by reference in its entirety.

STATEMENT REGARDING FEDERALLY FUNDED RESEARCH OR DEVELOPMENT

This invention was made with government support under grant numbers CNS-1319617, CCF-1116104 and CCF-0963759 from the National Science Foundation. The government has certain rights in the invention.

FIELD OF THE APPLICATION

The application relates to a system and method to quantify digital data sharing and particularly to a system and method to quantify digital data sharing in a multi-threaded execution.

BACKGROUND

With recent trends of using multicore processors in high throughput computing, multi-threaded applications are becoming increasingly important.

SUMMARY

According to one aspect, a method to quantify a plurality of digital data sharing in a multi-threaded execution includes the steps of: providing at least one computer processor; providing a computer readable non-transitory storage medium including a computer readable multi-threaded executable code configured to run on the at least one computer processor and a computer readable executable code configured to calculate a plurality of shared footprint values and an average shared footprint value; running the multi-threaded executable code on the at least one computer processor; running the computer readable executable code configured to calculate a plurality of shared footprint values and an average shared footprint value on the at least one computer processor or on another computer processor communicatively coupled to the at least one computer processor; calculating a plurality of shared footprint values by use of a linear-time process for a corresponding plurality of executable windows in time; and calculating and saving an average shared footprint value based on the plurality of shared footprint values to quantify by a metric the data sharing by the multi-threaded execution.

In one embodiment, the multi-threaded execution includes a trace from a multi-threaded program where each of the plurality of digital data sharing includes a datum is a memory cell.

In another embodiment, the at least one computer processor includes at least one multi-core processor.

In yet another embodiment, the plurality of shared footprint values includes a plurality of k+ sharer footprints.

In yet another embodiment, each k+ sharer footprint of the plurality of k+ sharers footprints is defined by the equation: $sfp_{k+}([i,j]) = |\{d \in D | d \text{ is used by at least k threads in } [i,j]\}|$.

In yet another embodiment, the average shared footprint includes an average of k+ sharer footprints.

In yet another embodiment, the average shared footprint value is defined by the equation:

$$\overline{sfp_{k+}}(l) = \frac{\text{sum of } k+\text{sharers footprints in length-}l \text{ windows}}{\text{number of length-}l \text{ windows}}$$

$$= \sum_{i=1}^{N-l+1} \frac{sfp_{k+}([i, i+l-1])}{N-l+1}.$$

In yet another embodiment, the average of k+ sharer footprints is calculated by the equation:

$$\overline{sfp_{k+}}(l) = |D_{k+}| - \frac{\sum_{d \in D_{k+}} \sum_{i=1}^{N} [SI_k^d(i) - SS_{k-1}^d(i)](i-l+1)^+}{N-l+1}$$

$$= |D_{k+}| = \frac{\sum_{i=1}^{N} \sum_{d \in D_{k+}} [i \cdot SI_k^d(i) - i \cdot SS_{k-1}^d(i)]}{N-l+1} +$$

$$\frac{\sum_{i=l}^{N} \sum_{d \in D_{k+}} [SI_k^d(i) - SS_{k-1}^d(i)](l-1)}{N-l+1}$$

$$= |D_{k+}| - \frac{\sum_{i=l}^{N} [i \cdot SI_k(i) - i \cdot SS_{k-1}(i)]}{N-l+1} +$$

$$\frac{\sum_{i=l}^{N} [SI_k(i) - SS_{k-1}(i)](l-1)}{N-l+1}.$$

In yet another embodiment, the method to quantify a plurality of digital data sharing further includes an analysis and optimization of a multi-threaded computer program.

In yet another embodiment, the analysis and optimization are further used to improve a run-time performance of the multi-threaded computer program configured to run on one or more multi-core processors.

In yet another embodiment, the method to quantify a plurality of digital data sharing further includes a sharing pattern analysis.

In yet another embodiment, the method to quantify a plurality of digital data sharing further includes a false sharing analysis.

In yet another embodiment, the method to quantify a plurality of digital data sharing further includes an effective cache scaling analysis.

In yet another embodiment, the method to quantify a plurality of digital data sharing completes in a single pass over an interleaved execution trace.

In yet another embodiment, the method to quantify a plurality of digital data sharing further includes determining a miss ratio prediction based on said shared footprint values.

In yet another embodiment, the method to quantify a plurality of digital data sharing further includes determining an optimization of thread-core mapping based on said shared footprint values.

According to another aspect, a method to quantify a plurality of digital data sharing for sequences of uses of objects includes the steps of: providing at least one computer processor; providing a computer readable non-transitory storage medium including a computer readable sequence of uses of objects and a computer readable executable code configured to calculate a plurality of shared footprint values and an average shared footprint value; running the computer readable executable code configured to calculate a plurality of shared footprint values and an average shared footprint value on the at least one computer processor or on another computer processor communicatively coupled to the at least one computer processor; calculating a plurality of shared footprint values by use of a linear-time process for a corresponding plurality of executable windows in time; and calculating and saving an average shared footprint value based on the plurality of shared footprint values to quantify by a metric the sequences of uses of objects.

In one embodiment, the sequences of uses of objects include sequences of actions or sequences of uses of data.

In another embodiment, the sequences of uses of objects include multiple streams of data requests.

According to another aspect, a computer system to quantify a plurality of digital data sharing in a multi-threaded execution includes a computer readable non-transitory storage medium including a computer readable multi-threaded executable code configured to run on the at least one computer processor and a computer readable executable code configured to calculate a plurality of shared footprint values and an average shared footprint value. The computer system also includes at least one computer processor configured to run the multi-threaded executable code. The computer readable executable code is configured to calculate a plurality of shared footprint values and an average shared footprint value also running on the at least one computer processor or the computer readable executable code configured to calculate a plurality of shared footprint values and an average shared footprint value running on another computer communicatively coupled to the at least one computer processor. The computer readable executable code is configured to calculate a plurality of shared footprint values and an average shared footprint value, to calculate a plurality of shared footprint values for a corresponding plurality of executable windows in time; and to calculate and save an average shared footprint value based on the plurality of shared footprint values to quantify by a metric the data sharing by the multi-threaded execution.

According to another aspect, a computer system that quantifies a plurality of digital data sharing in a multi-threaded execution includes a memory unit that stores a multi-threaded executable code. At least one computer processor is communicatively coupled to the memory unit and configured to run the multi-threaded executable code. A shared footprint process calculates a plurality of shared footprint values and an average shared footprint value of at least one run of the multi-threaded executable code. The shared footprint process runs on the at least one computer or on another computer. The shared footprint process is configured to calculate a plurality of shared footprint values and an average shared footprint value, to calculate a plurality of shared footprint values for a corresponding plurality of executable windows in time, and to calculate and save an average shared footprint value based on the plurality of shared footprint values to quantify by a metric the data sharing by the multi-threaded execution.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 3A shows an exemplary skeleton code for a threaded application;

FIG. 3B, shows a table of whole-execution data sharing in different groups of 4 threads;

FIG. 7A is a graph showing a footprint composition for the exemplary ferret program;

FIG. 7B is a graph showing a footprint composition for the exemplary facesim program;

FIG. 7C is a graph showing a footprint composition for the exemplary fluidanimate program;

FIG. 7D is a graph showing a footprint composition for the exemplary dedup program;

FIG. 7E is a graph showing a footprint composition for the exemplary bodytrack program;

FIG. 7F is a graph showing a footprint composition for the exemplary streamcluster program;

DETAILED DESCRIPTION

Figure 1:
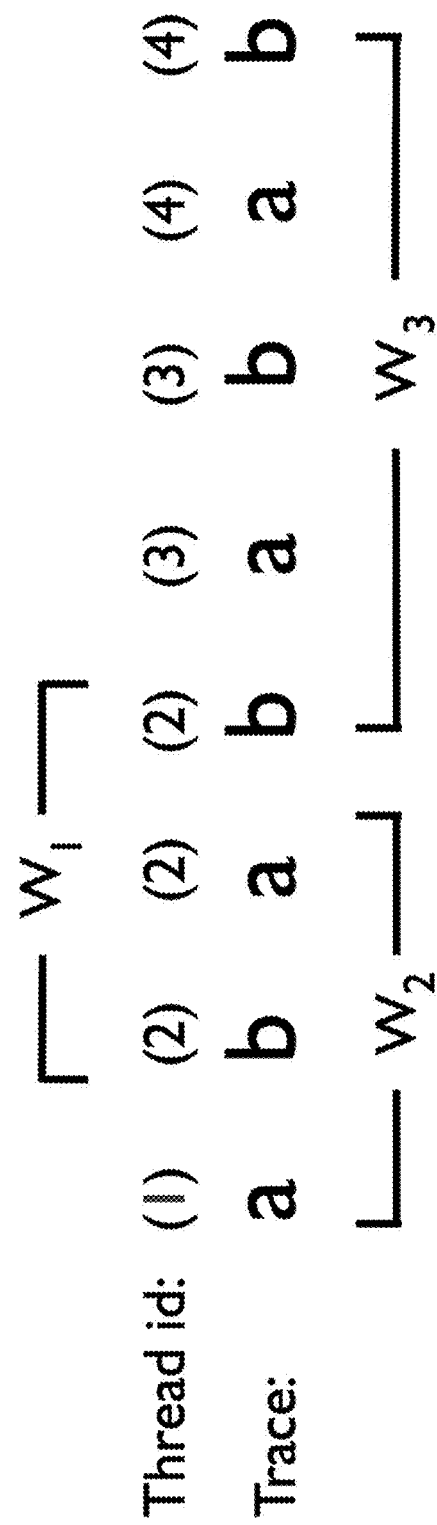
FIG. 1 shows an example of a multi-threaded execution trace.

In the description, other than the bolded paragraph numbers, non-bolded square brackets ("[ ]") with numbers separated by commas refer to the citations and references listed hereinbelow.

Data sharing metrics and a new system and method to measure the amount of data shared by different number of sharers and different access types (read/write) are described hereinbelow. An efficient process algorithm to measure all data sharing metrics and evaluate its asymptotic complexity and actual overhead is also described. Based on the measurement results on PARSEC benchmark suite, uses of the new system and method in sharing pattern analysis, false sharing detection, and scalability analysis are also described.

Shared Footprint

In a memory access trace, we define the footprint for each time window to represent the amount of data accessed in that window. In a multi-threaded execution, the accesses may come from different threads. The shared footprint is the amount of data accessed by at least two threads in the time window. A footprint, rather than a set, is a number, positive for non-zero length windows.

The footprint may differ depending on which window we measure and how long we measure. A complete measurement should consider all execution windows. For each length l, the average footprint fp(l) is the average footprint in all windows of length l. Similarly, we define the average for the shared footprint.

More formally, let a parallel execution trace be an interleaved sequence of data accesses, $s_1 s_2 \ldots s_N$ where each access $s_i$ is associated with the id $t_i$ of the accessing thread. We use the notation of intervals in mathematics to represent time windows. In the equations, square brackets such as [i, j] are the windows including both endpoints, while parentheses like (i, j) are those not including endpoints. The set of all data, shared or not, is denoted as D. The total size of D is M, M=|D|. M is the footprint of the length-N window.

The shared footprint is the size of data accessed by at least two threads. We can generalize and parameterize it by the number of sharers. The k+ sharers footprint of the window [i, j] can be defined as follows: $sfp_{k+}([i, j]) = |\{d \in D | d \text{ is used by at least k threads in } [i; j]\}|$ The average k+ sharers footprint of a window length l is:

$$\overline{sfp_{k+}}(l) = \frac{\text{sum of } k+\text{sharers footprints in length-}l \text{ windows}}{\text{number of length-}l \text{ windows}}$$

$$= \sum_{i=1}^{N-l+1} \frac{sfp_{k+}([i, i+l-1])}{N-l+1}$$

where N is the trace length.

Next we list the types of shared footprints including k+ sharers footprint sfpk+(l): the average amount of data accessed by at least k threads in a length-l window; k sharers footprint sfpk (l): the average amount of data accessed by exactly k threads in a length-l window; Read-only footprint: all accesses to the data are reads; and Read-write footprint: at least one access to each of the data is a write.

For example in a window, the read-write k+ sharers footprint is the size of the data that are accessed by at least k threads, and at least one of the accesses to each datum is a write. The average footprint is a function of l, which is the average size of such data in all length-l windows.

When k=1, we have two special cases. The 1+ sharers footprint includes all the data accessed. We call it the total footprint. The 1 sharer or sharers footprint includes the data accessed by only one thread. We call it the unshared footprint. Unshared means not actively shared and does not mean thread private. Footprint, shared or unshared, is about locality (active data usage). The traditional notions of shared and private are about visibility. The data used but unshared may be either private or shared.

Definitions are illustrated by the example shown in FIG. 1. In FIG. 1, each letter represents a data block and the number overhead is the thread id. First, let's consider the three windows marked in the figure. In $W_1$, two data blocks, a, b, are accessed three times in total, all by thread 2. The total footprint is 2, so is the unshared footprint. All shared footprints (k≥2) are 0. In $W_2$, data block a is accessed by two threads while b is accessed by only thread 2. The 2+ sharers footprint is 1. In $W_3$, three threads access data block b, and two access data block a. The 2+ sharers footprint is 2, the 3+ sharers footprint is 1, and the unshared footprint is 0.

Now considering the average footprint, let the window length be 3. There are 6 length-3 windows. In every window, except $W_1$, there is exactly one datum accessed by two or more threads. The average 2+ sharers footprint is therefore:

$$\frac{1+0+1+1+1+1}{6} = 0.83.$$

The average footprints for all k and l values are given in Table 1. When the window length is 1, only one thread can access. The total footprint is 1. The shared footprint is 0. Successive rows are for window lengths from 1 to 8. Across window lengths, the footprint is monotone and nondecreasing as l increases. Successive columns are for sharer counts from 1 to 4. For the same window length, the footprint is monotone and non-increasing as k increases.

TABLE 1

The average shared footprints of the example trace in FIG. 1. The footprint is non-increasing from left to right and non-decreasing from top to bottom.

| $\overline{sfp_{k+}}$ (l) | k = 1 | k = 2 | k = 3 | k = 4 |
|---|---|---|---|---|
| l = 1 | 1 | 0 | 0 | 0 |
| l = 2 | 2 | 0 | 0 | 0 |
| l = 3 | 2 | 0.83 | 0 | 0 |
| l = 4 | 2 | 1.60 | 0 | 0 |
| l = 5 | 2 | 1.75 | 0.75 | 0 |
| l = 6 | 2 | 2 | 1.33 | 0 |
| l = 7 | 2 | 2 | 1.50 | 0.50 |
| l = 8 | 2 | 2 | 2 | 1 |

Computation and use of the average footprint are described in more detail in the Appendices.

We have defined a collection of precise metrics to measure the shared footprint parameterized by the number of sharers and the type of sharing (read-read/read-write). We have developed a linear-time algorithm to measure all these metrics in a single pass over an interleaved execution trace. The efficiency is obtained by converting the footprint measurement to window counting and by counting the sub-k sharers instead of k+ sharers. We have optimized the implementation for concurrency. Using the shared footprint, we have studied the overhead of the measurement and non-determinism We can for the first time quantify the sharing pattern, false sharing, and effective cache scaling across all window and cache sizes. Since the shared footprint quantifies how concurrent threads interact with the memory hierarchy and how their data usage affects the efficiency and scalability of the system, it should be useful in evaluating software and hardware design decisions and improving scheduling at the application, operating system, virtual machine, and hardware levels.

Shared footprint analysis techniques described hereinabove can be run on either a single processor or on a multi-core processor. For example, threads of a multi-threaded application can be divided by time slices that run on a single core. A shared footprint analysis for a multi-threaded software application performed on a single core processor can be extrapolated to plan and estimate an efficient execution of the multi-threaded software application on a multi-core processor system.

The new shared footprint analysis described hereinabove is a linear-time process. Past attempts to make a similar analysis have generally failed to be useful in large systems because of an asymptotic complexity (i.e. unacceptable asymptotic rates of growth). The shared footprint analysis method and system described herein solves the computational time and resource problems by a new use of a linear-time process.

The shared footprint analysis has been described herein with respect to the analysis of a multi-threaded software execution. The execution can be a trace from a multi-threaded program where each datum is a memory cell. However, the same shared footprint analysis is also believed to be useful in other analysis applications.

A program is a sequence of actions, or a sequence of uses of data, or more generally a sequence of uses of objects (e.g. any suitable high level object, as compared with a memory cell, for example, a memory cell of a software multi-threaded analysis). Therefore, other large event spaces (typically digital data sharing), such as, for example, those having trillions of actions are believed to be particularly suitable for analysis using our new linear-time process and system, as compared to prior art analysis techniques which typically increase quadratically. The event space can also be any other concurrent sequence of uses of digital information such as, for example, a series of views of web pages or product information. The linear-time process aspect of the shared footprint analysis makes it particularly well suited to solving many problems in "big data" (e.g. trillions).

While the new shared footprint system and method has been applied to the execution of multithreaded code, where each thread generates a series of actions, which are accesses to data or objects, the series of actions can also come from other sources. For example, a series of client requests could be an example of a series of actions. With multiple simultaneous clients, their actions can be viewed as the same as a multi-threaded execution and the data sharing. Thus, in another application data accessed by multiple clients, can also be analyzed by the new shared footprint system and method.

Example: Consider for example, a distributed key-value store, e.g. Memcached, as is typically used by online services. User data are stored as key-value pairs, and multiple users may share data. Users are served from a set of applications running on one or more machines. Each application generates a stream of requests to the key-value store. The new shared footprint system and method can also be used to analyze the data sharing among multiple streams of requests. In this use of the new shared footprint system and method, each application corresponds to a thread, and the collection of key-value pairs corresponds to memory. One difference is that there is no multi-threaded code, however there are multiple applications.

Detailed Analysis, Theoretical Basis, and Examples

The new shared footprint system and method based on a new metric, shared footprint is now described in more detail including a theoretical derivation for those especially skilled in the art. As has been described hereinabove, the new shared footprint metric is defined as including a collection of metrics parameterized by the number of sharers, thread groups, access types, and by derivation, cache of all sizes. In one embodiment, the new shared footprint system and method includes a linear-time algorithm to measure these metrics in a single pass. In some embodiments, the efficiency can be further improved by parallelization and sampling. For example, we have measured and analyzed data sharing in 14 multi-threaded applications from PARSEC and SPEC OMP, including sharing spectrum, effect of interleaving, and optimization of thread-core mapping with an improved performance of up to about 60%.

Cache sharing on a multicore processor is usually competitive. In multi-threaded code, however, different threads may access the same data and have a cooperative effect in cache. The new metric of a new system and method called shared footprint and a new locality theory to measure and analyze parallel data sharing in cache is described in more detail hereinbelow. Shared footprint is machine independent, i.e. data sharing in all cache sizes, not just one cache size and compositional, i.e. data sharing in all thread sets, not just one set. An exemplary single-pass, parallel process the for measurement and evaluation of the new metric using 14 PARSEC and SPEC OMP benchmarks, including a use in improving the performance of multi-threaded code is also described hereinbelow.

Section 1—Introduction

Modern parallel programs are run on multicore machines with shared cache. Many programs are memory bound, spending most of the time accessing data. Most of the accesses happen in cache, which has multiple layers. The largest is the last level cache (LLC), which is shared by all cores. In the case of simultaneous multi-threading (SMT), threads can share all levels of cache.

As a program executes, its threads interact in the shared cache in two ways. They can cooperate: if a data block is shared, i.e. needed by multiple threads, one thread loads it into the shared cache for everyone to use. They can also compete: if a data block is private, i.e. needed by just one thread, it occupies cache space, leaving less room for other threads. To demonstrate this, we run two programs first on 1 processor and then on 2 processors.

Figures 2A, 2B:
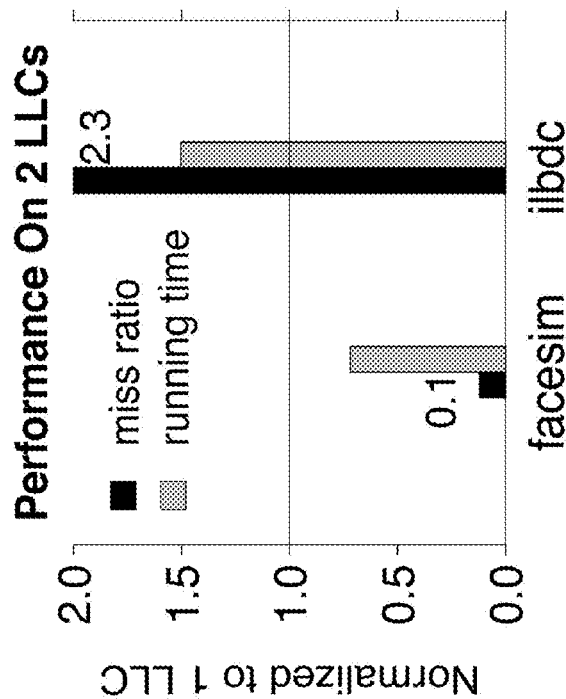
FIG. 2A is a bar graph which shows the performance on two exemplary LLCs for two exemplary programs.
FIG. 2B is a table which shows how a new process metric is needed to understand and derive the results of FIG. 2A.

FIG. 2A and FIG. 2B show how, given twice as much cache: the exemplary ilbdc application incurs more LLC misses and runs slower, while the exemplary facesim application incurs fewer misses and runs faster. The difference is data sharing in cache: with little or no data sharing, using 2 LLCs is beneficial; otherwise, it is more efficient to use 1 LLC.

FIG. 2A shows a bar graph illustrating two exemplary programs which see opposite effects when given twice as much (but separated) cache. The table of FIG. 2B shows the need for a new process metric to understand and derive the results on the left. See Section 8 hereinbelow for a review.

We now describe in more detail new systems and methods or processes based on a new metric called shared footprint to measure data sharing in cache. A data block is cache shared if it is used by multiple threads during a continuous period when it is in cache.

Shared footprint includes two properties:

Shared footprint measures the data sharing in all execution windows—First, shared footprint measures the data sharing in all execution windows, so it can predict performance in all cache sizes.

Shared footprint is compositional—Second, shared footprint is compositional in that the process can work with only one single-pass analysis over an interleaved execution trace and then is able to compose the data sharing in all thread groups.

There have been techniques described in the prior art to analyze data sharing. For example, in many studies of cache coherence in shared-memory processors and distributed shared memory (DSM), data sharing was simulated precisely but for specific cache. Recent work has developed concurrent reuse distance, which can derive the miss ratio for all cache sizes [19,24,31,32]. Concurrent reuse distance, however, has been measured, not composed. Without composition, the type of effects seen in FIG. 2A and FIG. 2B cannot be adequately studied and understood.

Shared footprint is specific to interleaving. This is both a weakness, i.e. data sharing may change in another run, and also a strength, i.e. the behavior of all thread groups is captured for the same execution. The shared footprint process is like taking one group photo and producing a photo for every sub-group as if it were taken specifically for the sub-group in the same instant. In comparison, testing cannot reproduce all thread-group results.

We do not solve the problem of how to optimize data sharing, neither do we consider the effect on coherence misses. Instead we solve its prerequisite: how to quantify data sharing. We build a theoretical foundation to support measurements and models that can be used to minimize the number of cache misses. Five new aspects of the new shared footprint process include:

One-pass, linear-time algorithms to measure data sharing in all cache sizes, all thread groups, different number of sharers and different access types (read-only and read-write). (See section 3);

Speed improvement using parallelization and sampling (See section 4);

Derived data sharing metrics including miss ratio, concurrent reuse distance, and two new metrics: cache sharing spectrogram and effective cache size. (See section 5);

Validation and uses on a multicore processor for PARSEC and SPEC OMP benchmarks, including an example of optimizing thread-core mapping. (See section 6 and section 7); and A short synthesis to show how shared footprint extends existing locality theory for shared cache. (See section 8)

Section 2—Data Sharing in Cache

Example: The Notion of Data Sharing, a Multi-Threaded Program

FIG. 3A shows an exemplary skeleton code for a threaded application. The PARSEC program dedup uses 7 threads to implement a 4-stage pipeline. When executed, the code constructs a 4-stage pipeline. The first three stages are parallel, and each has two threads. The last stage is sequential and has just one thread.

Each input data is processed in four stages by four threads. Most data sharing happens in 8 four-thread groups. The 8 groups and the amount of sharing, in (64-byte) blocks, are shown in the table of FIG. 3B. FIG. 3B shows that the whole-execution data sharing in different groups of 4 threads, equivalent to cache data sharing for an infinite size cache. The groups do not contain thread pairs (1,2), (4,5) or (6,7) in the same group, because the three pairs operate three parallel stages and do not share data. Thread 3 operates the last stage and is a sharer in every group. We call these results whole-execution data sharing. Data sharing in cache is more complex because it depends on the cache size and management. Only in fully-associative cache of an infinite size is the data sharing in cache the same as whole-execution data sharing.

Data Sharing in Cache: In Section 5.2 hereinbelow, we define a cache sharing spectrogram process. For each cache size, a cache sharing spectrogram shows what portion of cache is shared by how many threads, averaged over the entire execution. A sharing spectrogram shows how the sharing changes as the cache size increases. The full spectrogram includes whole-execution data sharing at the right end of the spectrogram as the sharing in the infinite-size cache.

Figure 3C:
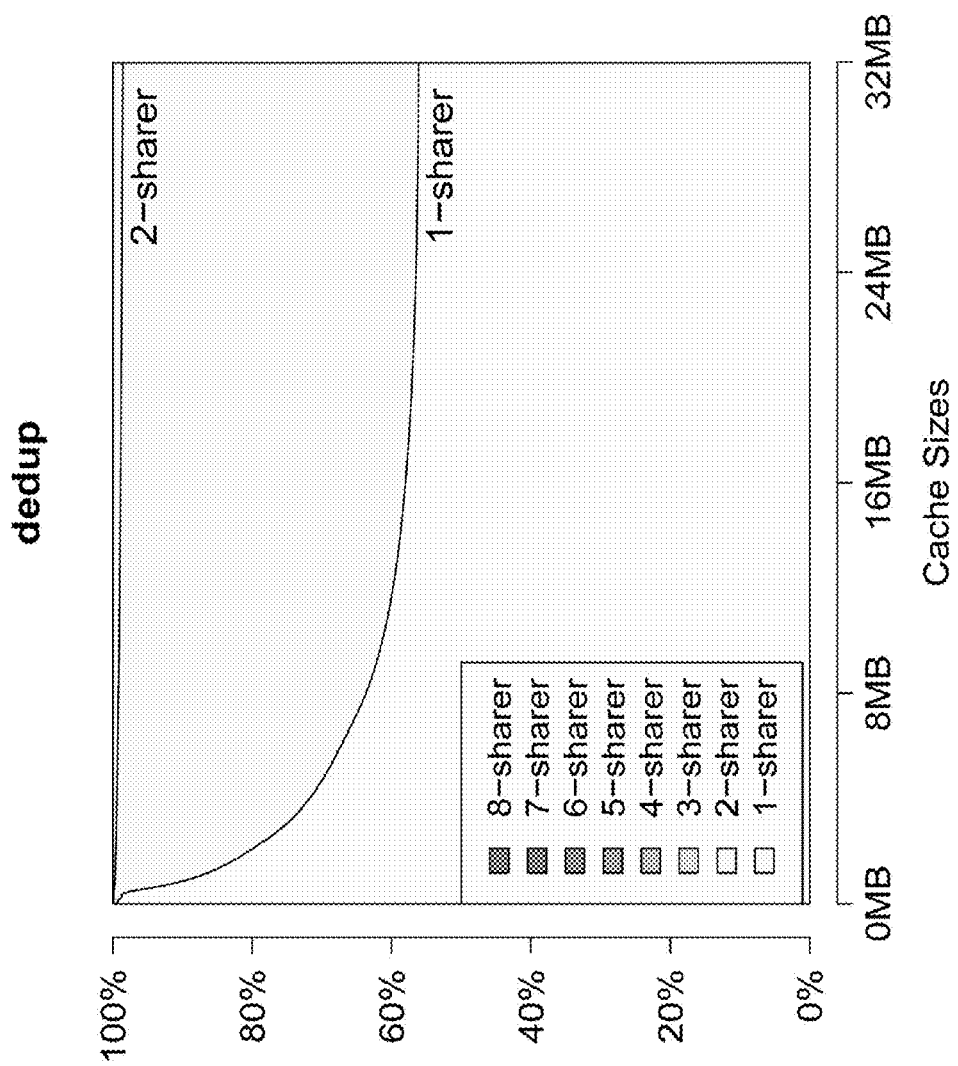
FIG. 3C shows a spectrogram illustrating data sharing for different caches sizes.

The spectrogram for the exemplary dedup application is shown in FIG. 3C. The spectrogram of FIG. 3C shows data sharing for cache size up to 32 MB. The spectrogram of FIG. 3C illustrates data sharing in cache by different number of threads for different size (fully associative LRU) cache. In the 32 MB cache, most data have less than 3 sharers (during their lifetime in cache). Most data in cache is either not shared or shared by no more than three threads, which is strikingly different from whole-execution data sharing, where most data are shared by four threads.

Section 3—Shared Footprint Analysis

Shared footprint is defined by window statistics. Size and other factors of cache when presenting derived metrics are introduced later in Section 5.

Section 3.1 Types of Shared Footprint

In one time window, the k+ threads sharing is the amount of distinct data accessed by k or more threads (k≥1). In all windows of length l, the k+ sharers footprint, $sfp_{k+}(l)$, is the average k+ threads sharing in all windows of length l.

$$sfp_{k+}(l) = \frac{\text{sum of } k+ \text{ threads sharing in length-}l \text{ windows}}{\text{number of length-}l \text{ windows}}$$

Next we list the types of shared footprints:

k+ sharers footprint $sfp_{k+}(l)$: the average amount of data accessed by at least k threads in all length-l windows;

k sharers footprint $sfp_k(l)$: the average amount of data accessed by exactly k threads, computed from k+ sharers footprints by $sfp_k(l)=sfp_{k+}(l)-sfp_{(k+1)+}(l)$;

Read-only footprint $sfp_{ro,k/k+}(l)$: the average amount of read-shared data by k or k+ threads; and Read-write footprint $sfp_{rw,k/k+}(l)$: the average amount of shared data with at least one thread writing to it.

The 1+ sharers footprint includes all the data accessed in windows, which gives the total footprint. The 2+ sharers footprint includes all shared data. The difference between 1+ and 2+ footprints is the data not shared, i.e. accessed by only 1 thread. We call it the unshared footprint. K sharers footprint is partitioned by read-only and read-write footprints, i.e. $sfp_k(l)=sfp_{ro,k}(l)+sfp_{rw,k}(l)$ Now turning back to FIG. 1, recall that FIG. 1 shows an example of a multi-threaded execution trace interleaved trace. Each letter represents a data block, and the number overhead is the thread id. First consider individual windows. In $W_1$, the unshared footprint is 2. In $W_2$, the 2 sharers footprint is 1. In $W_3$, the 2 sharers footprint is 1, 3 sharers footprint is 1, and unshared footprint is 0.

Now consider the average footprint for window length 3. There are 6 length-3 windows. In every window except $W_1$, there is exactly one datum accessed by two or more threads. The average 2+ sharers footprint is therefore $$\frac{1+0+1+1+1+1}{6} = 0.83.$$

The average footprints for all k and l values are given in Table 3. When the window length is 1, only one thread can access. The total footprint is 1. The shared footprint is 0. Successive rows are for window lengths from 1 to 8. Across window lengths, the footprint is monotone and non-decreasing as l increases. Successive columns are for sharer counts from 1 to 4. For the same window length, the footprint is monotone and non-increasing as k increases.

Table 1 shows the average shared footprints of the example trace in FIG. 1. The footprint is non-increasing from left to right and non-decreasing from top to bottom.

TABLE 1

| $sfp_{k+}(l)$ | k = 1 | k = 2 | k = 3 | k = 4 |
|---|---|---|---|---|
| l = 1 | 1 | 0 | 0 | 0 |
| l = 2 | 2 | 0 | 0 | 0 |
| l = 3 | 2 | 0.83 | 0 | 0 |
| l = 4 | 2 | 1.60 | 0 | 0 |
| l = 5 | 2 | 1.75 | 0.75 | 0 |
| l = 6 | 2 | 2 | 1.33 | 0 |
| l = 7 | 2 | 2 | 1.50 | 0.50 |
| l = 8 | 2 | 2 | 2 | 1 |

Section 3.2—Computing the k+ Sharers Footprint

In this section, the problem of footprint measurement is simplified mathematically. The trace length is denoted as N and the set of all data as D. Instead of enumerating all windows and taking their average, we count each datum's "contribution" to the average. While measuring the footprint of a time window is hard, we will show that counting the "contribution" of a datum is simpler and can be done efficiently.

First, the measurement problem is converted into a counting problem. Suppose datum d is accessed by t threads in the whole execution. Let $W_d^k(l)$ be the number of length-l windows in which d is accessed by at least k threads. The shared footprint can be computed by adding the contribution from all data d and dividing it by the number of windows:

$$sfp_{k+}(l) = \frac{\sum_{d \in D} W_d^k(l)}{N - l + 1}$$

It can be shown that counting the windows with fewer than k sharers is easier than counting those with at least k sharers. We define a type of window as follows: For datum d, a window (i, j) is a maximal sub-k sharing interval (k>0) if (1) inside the window (between [i+1, j−1]), d is accessed by k−1 threads, and (2) the window is maximal in that any window enclosing it must have k or more threads accessing d.

For brevity, we call the maximal sub-k sharing interval simply the sub-k interval. Excluding boundary windows, i.e. i>0 or j<N, for an interval to be sub-k, both ends of the interval, accesses at times i, j, must be accesses to d, and the accessing threads, $t_i$ and $t_j$, must not access d inside the interval. For example in FIG. 1, for datum b, $W_1$ is a sub-1 interval, and $W_3$ is a sub-2 interval.

Lemma 3.1:

Let datum d be accessed by k or more threads in an execution. d does not have k sharers in a window W if and only if W is nested in a sub-k interval of d.

Proof: Assume d has at most k−1 sharers W. We can expand W as much as possible. Since d has at least k sharers in the execution, the expansion cannot carry on forever. When it stops, we have a sub-k interval covering W. On the other hand, any part of a sub-k interval of d has at most k−1 sharers.

We pick out a sub-type of sub-k intervals called switch as follows: A sub-k interval (i, j) for datum d is called a sub-k switch (k>0) if the accesses to d at times i, j are by two different threads, i.e. $t_i \neq t_j$.

$W_3$ in FIG. 1 is a sub-2 switch and $W_2$ is a sub-1 switch. $W_1$ is not a switch.

Two sub-k intervals may overlap. Consider the expansion of a sub-(k−1) switch into a sub-k interval. The expansion can occur on either side but not on both sides at the same time. By expanding on each side, we obtain two overlapping sub-k intervals from a sub-(k−1) switch.

A numerical relation between intervals and switches is given in Lemma 3.2.

Lemma 3.2

For datum d, a window is covered by n sub-k intervals if and only if it is covered by n−1 sub-(k−1) switches.

Proof ⇒ Suppose the n sub-k intervals that cover the window are $(a_1,b_1), (a_2,b_2), \ldots, (a_n,b_n)$ and $b_1 < b_2 < \ldots < b_n$. Because they are maximal, they cannot contain each other. Therefore, $a_1 < a_2 < \ldots < a_n$. Since they all contain the window, we have $a_n < b_1$. We next show that $(a_2, b_1)$, $(a_3, b_2), \ldots$, and $(a_n, b_{n−1})$ are n−1 sub-(k−1) switches.

Without loss of generality, consider the sub-k interval $(a_i, b_i)$. Thread $t_{b_i}$ accesses d at the trailing end but not inside the interval. Thread $t_{a_{i+1}}$ accesses d inside the interval, so $t_{a_{i+1}} \neq t_{b_i}$.

Let a' be the leftmost position in the interval $(a_i, b_i)$ such that $(a', b_i)$ has exactly k−2 sharers for d. a' must exist and $a_i < a'$, since $(a_i, b_i)$ already has k−1 sharers. Thread $t_{a'}$ accesses d at a' and must differ from any sharers in $(a', b_i)$; otherwise, a' would not be the leftmost position.

We now prove that a' is $a_{i+1}$ by contradiction. If the two are not the same, there are two cases with regard to their relative position:

First case: If $a_{i+1} < a'$, then $(a_{i+1}, b_i)$ contains $(a', b_i)$, and the two are not equal. $(a', b_i)$ has k−2 sharers and $t_{a'}$ adds a new sharer. Since $(a_{i+1}, b_{i+1})$ is sub-k interval, $t_{a_{i+1}}$ differs from those k−1 sharers. In this case, the interval $(a_i, b_i)$ would have k sharers, contradicting the assumption that it is a sub-k interval.

Second case: If $a' < a_{i+1}$, then $(a', b_i)$ contains $(a_{i+1}, b_i)$, and the two are not equal. Since $(a', b_i)$ contains k−2 sharers, we can expand it to the right to form a sub-k interval by including at least one position to include $b_i$. Since $t_{b_i}$ differs from $t_{a'}$ and these k−2 sharers, the sub-k interval can be formed.

This sub-k interval is not any of the $(a_k, b_k)$, contradicting the fact that the window is covered by n sub-k intervals.

Therefore, a' is $a_{i+1}$. There are exactly k−2 sharers between $a_{i+1}$ and $b_i$. Since $t_{a_{i+1}}$ must differ from $t_{b_i}$, $(a_{i+1}, b_i)$ is a sub-(k−1) switch.

⇐ Suppose that the n−1 sub-(k−1) switches are $(a_1, b_1), \ldots, (a_{n−1}, b_{n−1})$. Because $t_{a_j}$ differs from $t_{b_j}$ and from every thread accessing d in $(a_j, b_j)$, intervals $(a_j, b_{j+1})$ with $j = 1, \ldots, n−2$ are n−2 sub-k intervals. In addition, stretching $(a_1, b_1)$ to the left to include $a_1$ and $(a_{n−1}, b_{n−1})$ to the right to include $b_{n−1}$ yield two more and a total of n sub-k intervals covering the window.

Figure 4:
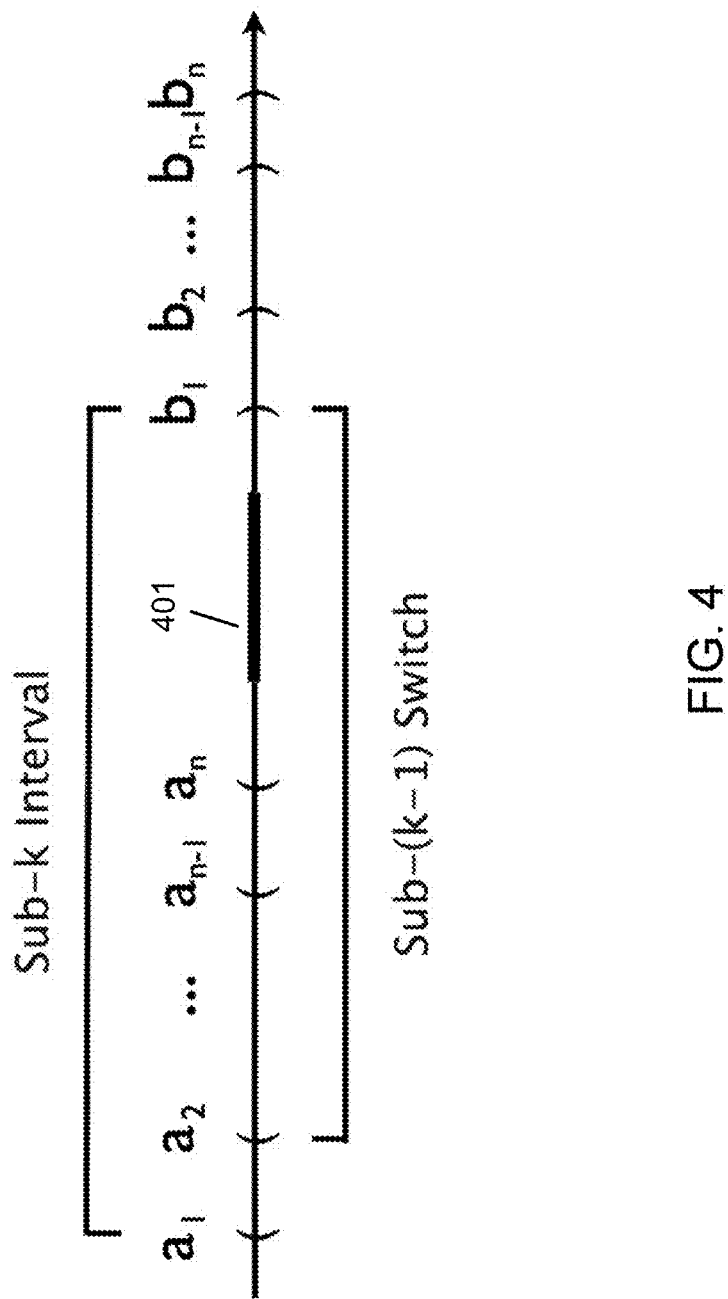
FIG. 4 shows an illustration for the first part of the proof of Lemma 3.2.

FIG. 4 shows an illustration for the first part of the proof of Lemma 3.2. The segment 401 is the window of concern. Each is a sub-interval. The proof shows that is a sub-( ) switch.

Let l be the length of the windows we wish to count for those that have k sharers for datum d. If there is a sub-k interval of length L, it will cover $(L−l+1)^+$ length-l windows, where the function $(x)^+$ is x if x>0 and 0 otherwise. In these windows, the number of sharers is k−1 or less.

From Lemma 3.1, any window with fewer than k sharers is covered by a sub-k interval. Therefore, the windows not covered by any sub-k interval have at least k sharers. Hence the original problem of k+ sharers footprint is converted to one that counts the number of windows that have sub-k sharers.

Sub-k intervals may overlap, so the same window may be overcounted. From Lemma 3.2, the effect of overcounting can be canceled using sub-k switches.

Let $SI_k^d(l)$ and $SS_k^d(l)$ be the count of length-l sub-k intervals and sub-k switches respectively. Then we have following result:

Theorem 3.3 The total count of length-l windows with fewer than k sharers of d is:

$$\sum_{i=1}^{N}[SI_k^d(i) - SS_{k-1}^d(i)](i-l+1)^+$$

Proof: As stated above, the quantity $\sum_{i=1}^{N}[SI_k^d(i)(i-l+1)^+]$ is the number of length-l windows with fewer than k sharers, but with overcounting. The overcounting is removed by subtracting $\sum_{i=1}^{N}[SS_k^d(i-l+1)^+]$. The result counts the windows covered by a sub-k interval exactly once. From Lemma 3.1, this value is the number of the length-l windows with less than k sharers.

From Theorem 3.3 and Equation (1), we can derive the formula for the k+ sharers footprint:

$$sfp_{k+}(l) = |D_{k+}| - \frac{\sum_{d \in D_{k+}}\sum_{i=1}^{N}[SI_k^d(i) - SS_{k-1}^d(i)](i-l+1)^+}{N-l+1} \quad (2)$$

$$= |D_{k+}| - \frac{\sum_{i=1}^{N}\sum_{d \in D_{k+}}[i \cdot SI_k^d(i) - i \cdot SS_{k-1}^d(i)]}{N-l+1} +$$

$$\frac{\sum_{i=l}^{N}\sum_{d \in D_{k+}}[SI_k^d(i) - SS_{k-1}^d(i)](l-1)}{N-l+1}$$

$$= |D_{k+}| - \frac{\sum_{i=l}^{N}[i \cdot SI_k(i) - i \cdot SS_{k-1}(i)]}{N-l+1} +$$

$$\frac{\sum_{i=l}^{N}[SI_k(i) - SS_{k-1}(i)](l-1)}{N-l+1}.$$

The formula depends on three terms. $D_{k+}$ is the set of data shared by at least k threads in the execution, and $|D_{k+}|$ is its cardinality. $SI_k(i)$ is $\sum_{d \in D_{k+}} SI_k^d(i)$, the cumulative sub-k intervals for all data in $D_{k+}$. Similarly $\sum_{d \in D_{k+}} SS_k^d(i)$ is denoted as $SS_k(i)$. All three terms can be obtained by scanning the whole trace in one pass, as will be shown in the next section.

Section 3.3 One-Pass Linear-Time Measurement

Exemplary process algorithm 1 profiles the memory trace in one pass and computes the shared footprint using Equation (2) (line 28 of the exemplary process algorithm hereinbelow).

The process algorithm maintains a list for each data block to store the last access times by each thread ordered by increasing time. At every memory access, the list of the accessed block will be traversed once (line 5-12). For each element e in the list, the time interval between the current time $t_{now}$ and the recorded time of the element e.time will be accumulated in the histograms SS and SI accordingly (line 6 and line 10). At program finish, the maximal intervals at the boundary are also collected (line 22).

The algorithm analyzes each thread in parallel and maintains three shared data structures. The first is a global counter $t_{now}$ for the logic time. Then the metadata for each datum, e.g. 64-byte cache block, records the last access time by each thread for the datum, sorted in the descending order of the reference time. Finally there are 2T records for the sub-k intervals and switches, $SI_k(i)$ and $SS_k(i)$, for every $1 \le k \le T$. A re-sizable hash table was used to map cache line addresses to the metadata. In the exemplary embodiment of process algorithm 1, fine grained locking was used, in particular, to serialize operations on each cache set.

When a thread thread_id accesses datum cache_line, the first procedure in Algorithm 3.3 is called. It increments $t_{now}$ and traverses the (sorted) list of last access times for the cache_line. For the i th element in the list, let the thread ID and latest reference time stored be e.tid and e.time.

There are two cases. If e.tid is that of the current accessing thread (e.tid equals to thread_id), the interval (e.time,$t_{now}$) is a sub-(i−1) interval. If e.tid and thread_id are not the same, (e.time,$t_{now}$) is both a sub-(i−1) interval and a switch. Both $SI_{i-1}(t_{now}-t_i)$ and $SS_{i-1}(t_{now}-t_i)$ will be incremented. If thread_id is not found in the list, the current access is the first access to this cache line by the thread. The interval $(0,t_{now})$ is a sub-(i−1) interval and will be counted.

After the list traversal, all $SI_k$ and $SS_k$ records are updated for this memory reference. The list is updated by removing the old entry for the thread (if it exists) and inserting a new entry with the current thread and access time at the head of the list.

After processing the trace, the procedure goes through every datum and examines its list of access times one last time to count the sub-k intervals that ends at the end of the trace and add them to $SI_k$. Also, by examining all data, we can determine the data sizes $D_{k+}$, the volume of data shared by at least k threads (k≤T) which is used in the final formula, given at the end of process algorithm 1.

The time complexity is O(NT+MT), where M is the total footprint, N is the trace length, and T is thread count.

The space complexity is O (2NT+MT) if we compute the shared footprint for every window length. However, it is sufficient only to maintain logarithmically many window lengths in practice by grouping the N window lengths in O (log N) ranges. $SI_k(i)$ and $SS_k(i)$ is now counting the windows in the i th range. $i \cdot SI_k(i)$ and $i \cdot SS_k(i)$ are also profiled in O (log N) ranges independent of $SI_k(i)$ and $SS_k(i)$. The space overhead is reduced to O (2T log N+MT).

Process Algorithm 1:

---

Algorithm 1 Algorithm of k+ sharers footprint

Require: A trace of execution
Ensure: None
1:    procedure MEMORY_REFERENCE_CALLBACK(cache_line, thread_id) ▷ This routine is called upon reading in a new element in the trace, cache_line is the data, thread_id is its accessing thread
2:       $t_{now} \leftarrow N$
3:       $N \leftarrow N + 1$
4:       $k \leftarrow 1$
5:       for e in cache_line's list do
6:          $SI_k[t_{now} - e.time] \leftarrow SI_k[t_{now} - e.time] + 1$
7:          if thread_id equals to e.tid then
8:             break
9:          end if
10:         $SS_k[t_{now} - e.time] \leftarrow SS_k[t_{now} - e.time] + 1$
11:         $k \leftarrow k + 1$
12:       end for -continued Algorithm 1 Algorithm of k+ sharers footprint

```
13:        if thread_id is not found in cache_line's list then
14:           SI_k[t_now] ← SI_k[t_now] + 1
15:        end if
16:        promote thread_id and t_now to the list head
17:    end procedure
18:    procedure POST_PROCESSING ▷ This routine is called after
       reading all elements of the trace
19:    for every cache line c having appeared in trace do
20:        k ← 1
21:        for every element e in c's list do
22:           SI_k[N − t_now] ← SI_k[N − t_now] + 1
23:           D_{k+} ← D_{k+} + 1
24:           k ← k + 1
25:        end for
26:    end for
27:    end procedure
```

28:
$$\text{sfp}_{k+}(l) = D_{k+} - \frac{\sum_{i=l}^{N}[SI_k(i) - SS_{k-1}(i)](i - l + 1)^+}{N - l + 1}$$

Section 3.4 Thread Group Sharing

A thread-group footprint or a group footprint in short is the amount of data accessed by a particular group of threads. Group footprints are finer partitions of a k sharers footprint, showing which k threads are sharing which portion. For example in an execution of 3 threads: $T_1$, $T_2$, $T_3$, the 2 sharers footprint is made of three parts: $\{T_1,T_2\}$ group footprint, $\{T_2,T_3\}$ group footprint, and $\{T_1,T_3\}$ group footprint. The 2 sharers footprint is completely partitioned by the three non-overlapping group footprints.

Group footprints are measured similarly as k+ sharers footprints. While counting the contribution of each datum to k+ sharers footprints, we can be more precise and count the contribution to each thread group and each window length. The main overhead is space. If we count for all window lengths, we will need additional O ($2^T$ N) space (one value per thread group per window length). To balance precision and cost, we choose the window length $2^i$ (i>12), which requires almost only O($2^T$) space. Then we can get the precise thread group footprints at the above lengths and use interpolation to estimate between these lengths. Interpolation has a stable accuracy because of a mathematical property—the footprint is a concave function over window lengths (when trace length n? w the window length) [35].

With thread group sharing, we can predict data sharing in all thread groups for all window lengths. One example has been shown in FIG. 2 as the data sharing in 4-thread groups for one window length (the entire execution).

Section 3.5 Read-only and Read-write Footprint

To measure the k+ sharers read-only footprint, we make a few changes in the algorithm. For datum d, we profile its maximal read-only sub-k sharing intervals and switches for k>0. These two concepts have the same properties as given in the two lemmas in Section 3.2. By combining these using Theorem 3.3, we can count the windows with fewer than k read-only sharers. Using the read-only footprint in Equation (2), we have the k+ sharers read-only footprint. By taking the difference between the k+ sharers footprint and its read-only sub-part, we have the read-write k+ sharers footprint. Further taking the differences, we have the k sharers read-only and read-write footprint.

Section 4
Parallel Measurement and Sampling

We start with the most serialized solution based on a global lock and then remove as much serialization as possible using two techniques. In addition, parallel measurement is combined with sampling.

Global Lock

In some embodiments, threads are instrumented so each analyzes its own accesses. At each memory access, a thread increments the global time counter and updates the list of last access times for the accessed datum. In the initial solution, a thread uses a global lock to serialize the time increment and list update in order to avoid data race.

Atomic Time Counter and Privatization

Global time can be implemented as an atomic variable, so the increment is done much faster using a hardware atomic instruction. In addition, the access record can be privatized. Privatization is possible because the counting of reuse intervals (SS and SI) and total footprints ($D_k$) is commutative. When a thread exits, it adds its private records atomically to the global records. With privatization, updates on reuse histogram are completely parallel.

Distributed Time Stamp Counter (TSC)

Instead of a global time counter, which still requires synchronization to access, we use the per-core hardware time stamp counter (TSC), available on most modern processors. At every memory access, the time is obtained by reading the host-core's TSC register. Meanwhile, the thread also counts the number of its memory accesses. When computing the footprint, we measure the window length in CPU cycles but also compute the average CPU cycles per memory access. Combining the two, we obtain the shared footprint in window lengths in terms of memory accesses.

Sampling

We periodically take a subtrace and measure the shared footprint. This has two benefits. First, it reduces the cost. For example, some OpenMP benchmarks are so long running that there are several hours in a native run, for which the full profiling failed to finish. With sampling, we found that the parallel behavior is repetitive and could be quickly captured by a few samples. Second, sampling improves the accuracy of miss ratio prediction. For programs with different phases, sampling can generate different shared footprint profiles for each phase. We found that combining each phase's miss ratio leads to more accurate prediction.

Section 5 Derived Metrics for Shared Cache
Section 5.1 Miss Ratio and Reuse Distance To convert between the footprint and the miss ratio, we use a theoretical result by Xiang et al. [35]. The miss ratio function mr(c) is the derivative of the footprint function fp(l). Formally $$mr(c) = mr(fp(x)) = \frac{fp(x + \Delta x) - fp(x)}{\Delta x}$$

Intuitively, if footprint fp(x)=c, then x is the average time for a program to populate the cache of size c with the data in the last x accesses. After an additional time $\Delta x$, the footprint is increased by $fp(x+\Delta x)-fp(x)$, which are new data and therefore misses in the cache. The ratio is the miss frequency, hence the miss ratio. Xiang et al. gave the condition for correctness and showed that it is accurate on real hardware with set-associative caches [35].

Footprint can be used to compute reuse distance [35]. Reuse distance has been used as a shorter name for LRU stack distance [21]. Reuse distance shows the hit or miss by each memory access for all sizes of fully-associative LRU cache as well as set-associative 26,16] and non-LRU cache [25]. It has many uses in program optimization and memory management [37].

The reuse distance for a group of threads running in shared cache is called concurrent reuse distance [19,24,31, 32]. Shared footprint can derive the footprint for every thread group, its shared cache miss ratio in all cache sizes and its concurrent reuse distance.

Section 5.2 Cache Sharing Spectrogram

Assume the cache is fully-associative LRU. Given a program execution, if we stop at a random point and look at the data accessed in the most recent l-long window, the footprint is $sfp_{1+}(l)$, which means the accesses in the window fills the cache of size $sfp_{1+}(l)$. The shared footprints $sfp_k(l)$ are the portions in this cache accessed by k threads. We call $sfp_k(l)$ the sharing spectrum for this cache size. If we show the sharing spectrums in all cache sizes, we have the sharing spectrogram. An example was shown earlier in FIG. 5. The spectrogram captures data sharing in different cache sizes. As an instrument for generating the spectrogram, shared footprint analysis may be called the cache sharing spectrograph.

Section 5.3 Effective Cache Size Scaling

Cache has a fixed size, and hence we have a fundamental tension in multicore scaling: the cumulative CPU power scales, but the total cache capacity does not. This problem cannot be solved by building processors with larger cache. In fact, the larger the cache, the more disproportionately the single-thread performance may benefit.

There is a unique problem in multicore performance scaling. As a program uses more cores, the size of shared cache does not change. With sufficient sharing, however, a thread may keep the same amount of data in cache even when there are more threads running. While the physical cache size does not change, the effective cache size may scale with the number of threads.

We compute the effective cache size. Take the cache spectrum for cache size c. The effective cache size counts each portion by multiplying the size by the number of sharers, i.e. k sharers footprint is counted k times. An equivalent way is to calculate the size of data contained in the cache for each thread and compute their arithmetic sum. The first calculation needs only the k sharers footprint, while the second calculation needs thread group sharing (Section 3.4). The first method is easier and sufficient.

Section 6 Evaluation

This section evaluates the speed and accuracy of shared footprint analysis and the effect of interleaving.

Section 6.1 Experimental Setup

To evaluate, we profile the parallel benchmarks from PARSEC and SPEC OMP Benchmark Suite [4] using the binary rewriting tool Pin from Intel [20]. We evaluate our tool on 8 Pthread benchmarks from PARSEC and 6 OpenMP benchmarks from SPEC OMP 2012. These 8 PARSEC benchmarks represent a wide range of parallel programming patterns such as data-parallel (blackscholes), pipeline-style (dedup) and task-parallel (facesim). The 6 SPEC OMP benchmarks are widely used for evaluation of OpenMP applications. We exclude some benchmarks because of 1) too small memory usage (swaptions from PARSEC); 2) too large memory usage for our test machine (mgrid331 and ilbdc on ref size from SPEC OMP); 3) too many threads created (x264 from PARSEC); and 4) failure to compile (bt331 from SPEC OMP). Two machines are used for data collection and performance testing.

TABLE 2

| benchmarks | native (sec.) | k-sharers | | thread group | |
|---|---|---|---|---|---|
| | | time (sec.) | slowdown | time (sec.) | slowdown |
| blackscholes | 0.460 | 146 | 317x | 189 | 411x |
| bodytrack | 0.860 | 241 | 280x | 650 | 755x |
| canneal | 0.404 | 57 | 142x | 83 | 207x |
| dedup | 6.649 | 1730 | 260x | 2372 | 356x |
| facesim | 1.974 | 828 | 419x | 1263 | 639x |
| ferret | 2.100 | 750 | 357x | 1067 | 508x |
| fluidanimate | 0.679 | 342 | 503x | 595 | 876x |
| streamcluster | 1.627 | 1216 | 747x | 2336 | 1435x |

Cost of Measuring k-Sharers and Thread-Group Footprints Using Full-Trace Profiling (Section 3.3)

TABLE 3

| benchmarks | input | R | C (MB) | slowdown |
|---|---|---|---|---|
| blackscholes | native | $10^{10}$ | 32 | 19x |
| bodytrack | simlarge | $10^8$ | 32 | 778x |
| canneal | simlarge | $2 \times 10^8$ | 32 | 14x |
| dedup | simlarge | $2 \times 10^9$ | 32 | 245x |
| facesim | simlarge | $2 \times 10^9$ | 32 | 114x |
| ferret | simlarge | $2 \times 10^9$ | 32 | 47x |
| fluidanimate | native | $10^{10}$ | 32 | 57x |
| streamcluster | native | $10^{10}$ | 32 | 10x |

Cost of Measuring Thread-Group Footprints Using Sampling

One machine has 8 physical cores (2.27 GHz Xeon E5520), with each 4 sharing 8 MB LLC. The other has 12 2-hyperthreading cores (2.53 GHz Xeon E5649), with each 6 sharing 12 MB LLC.

Section 6.2 Profiling Cost

To measure the overhead, we use the 8-core machine. The baseline is the native execution time on 8 threads with no instrumentation. Three implementations in Section 4 are compared in Table 2. We only instrumented the build-in region of interest for PARSEC benchmarks.

The slowdown of k-sharers analysis is between 142x and 503x for 7 of the benchmarks and 747x for streamcluster. Thread group analysis may be twice as long. The slowdown factors are larger than usual in locality profiling. For example, the cost of reuse distance analysis is between 52 and 426 times (153 average) for SPEC 2006 as reported in a recent study [35]. However, the previous work profiles sequential programs. In our experiment, the baseline is unmodified 8-threaded parallel execution time. The relative overhead would be much closer if we compared with the sequential running time. Next, we show the improvement we can obtain through sampling.

We take a sample at regular intervals of length R for footprint C. We fix C to be 32 MB, and the interval length R ranges from $10^8$ to $10^{10}$, shown in Table 3. The overhead of sampling analysis is contained in 250x slowdown except for bodytrack. Most of the benchmarks have slowdown within 100x. Bodytrack shows one limitation: if the memory footprint of the application is small, the threshold C may never be reached, and the sampling will degenerate into full profiling.

6.3 Effect of Interleaving

A parallel execution has many sources of non-determinism due to hardware and OS scheduling. The instrumentation and analysis also perturb the parallel execution, and the effect has been shown to reduce the speed difference between threads in relative terms since all threads spend most time in the instrumentation code [19].

Figure 5:
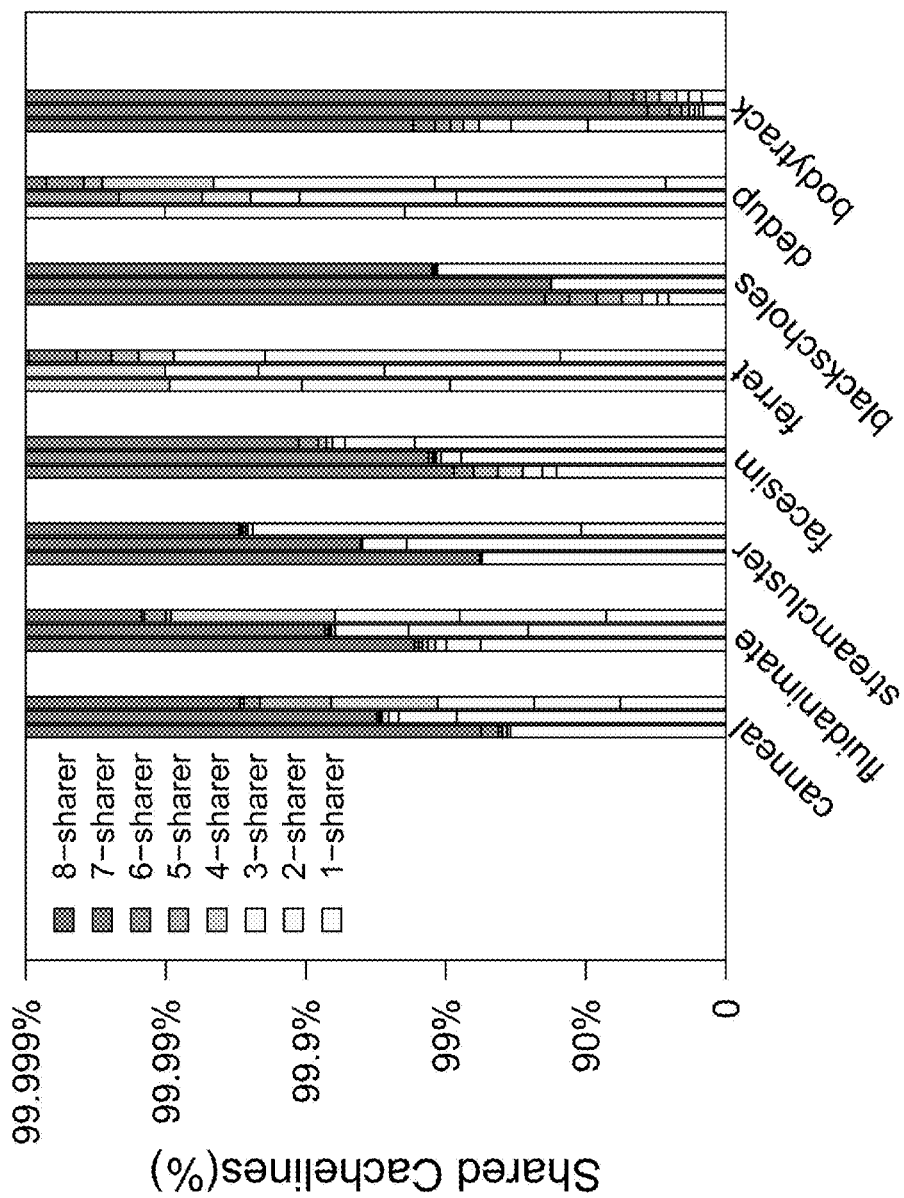
FIG. 5 shows an exemplary sharing spectrum of an 8-thread execution of 8 PARSEC benchmarks.

Cache sharing spectrum can be used to quantify how thread interleaving affects cache utilization. To demonstrate, we run the 8-threaded PARSEC tests on two machines, one with 8 cores and the other 12 cores. FIG. 5 shows the sharing spectrums for PARSEC programs for three cache sizes: 32 KB, 256 KB, and 8 MB. In most programs, most of the cache, over 90%, contains unshared data. To magnify the shared portions, we plot the y-axis in a logarithmic scale to show the shared 10% or 1% of the cache.

Figure 6:
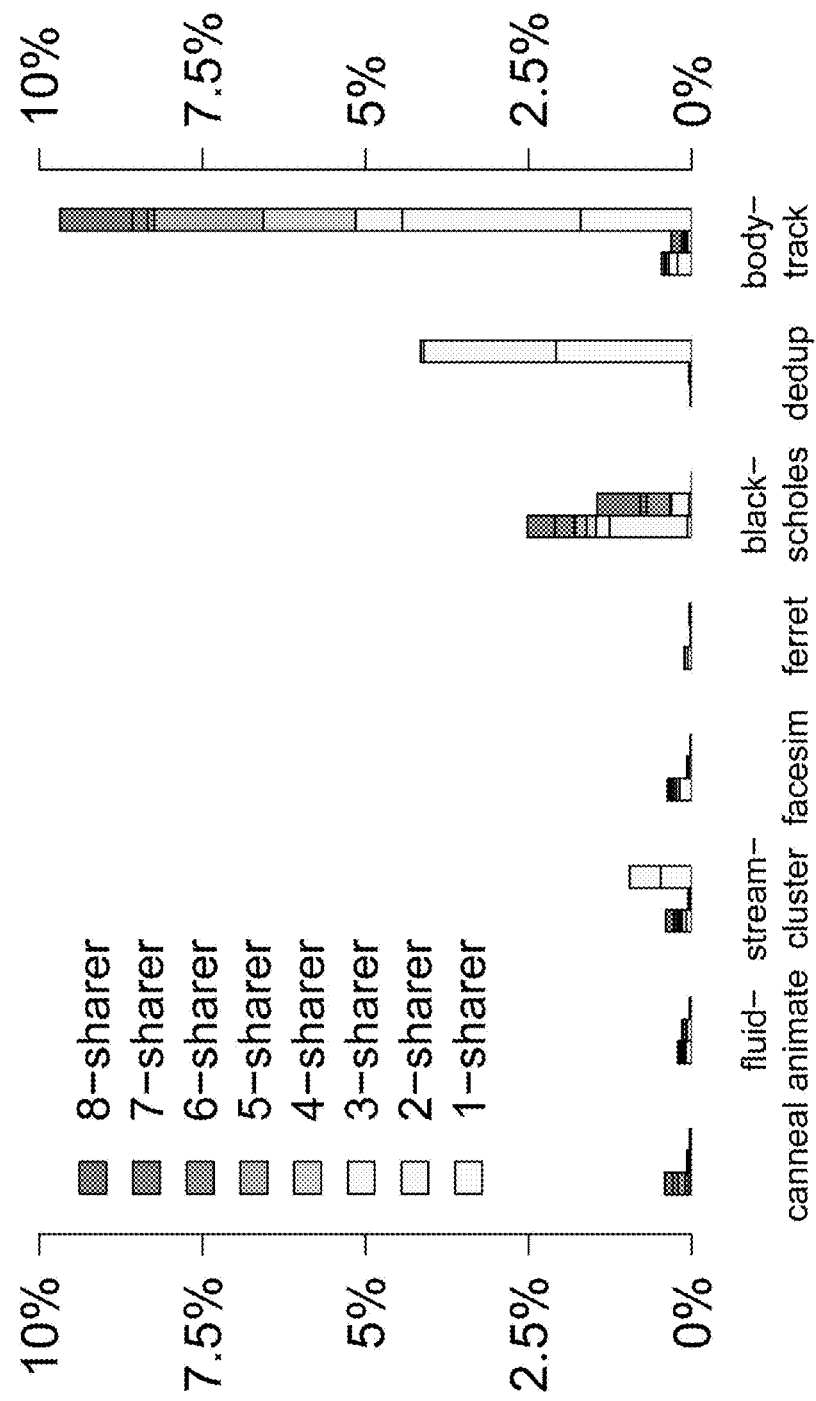
FIG. 6 is a graph showing the difference between sharing spectrums on two different machines due to different thread interleaving.

FIG. 6 shows the absolute difference between the spectrums on the two machines. Each bar is the Manhattan distance between two spectrums. One previous conjecture about interleaving was that the non-deterministic effect was more visible in short time periods than in long time periods, and more in small cache than in large cache. The spectrum results show that the intuitive view is not true. While the largest cache sees the smallest variation (under 0.3%) in 6 programs, the variation is largest (4% to 10%) in the other 2 programs.

Previous work collects sharing results by simulation. Bienia et al. found that because of different thread interleaving, the number of memory accesses varies by ±4.7%, and the amount of sharing changes by ±15.2% in 4-way set associative 4 MB cache [4]. Simulation is cache specific. With shared footprint, we can now show the interleaving-induced variation in all cache sizes.

As we see in these results, data sharing in cache changes from program to program, cache size to cache size, execution to execution (different interleavings), and input to input (which we don't evaluate here). Through the derived metric of sharing spectrum, shared footprint enables quantitative analysis of these variations.

6.4 Thread Group Composition

We examine all 4-thread groups in each of the benchmarks on 8-threaded runs. It would be difficult to see clearly if we plot the results for all 70 4-thread groups for all the benchmarks, but 2 groups for each program can be shown clearly. The two thread groups with the smallest and the largest footprint are shown. The space between them demonstrates the range of the remaining 68 results.

To evaluate the accuracy, we compare the thread group footprint predicted from the shared footprint with the directly measured footprint by running Xiang et al.'s algorithm [34] on the (interleaved) accesses from only the threads in the thread group. We re-ran a program for prediction and measurement, so the difference may due partly to interleaving. The predicted and measured footprints are plotted in FIG. 7A to FIG. 7F. Each graph in FIG. 7A to FIG. 7F has two pairs of footprint curves for comparison.

The graphs of FIG. 7A to FIG. 7F show a footprint composition for all 4-thread groups. The x-axis is the window length in logarithmic scale and y-axis is the footprint. Only the two groups with the smallest and largest footprints are shown. The footprint of the other 68 groups falls in between. 6 PARSEC benchmarks are shown here. The other two, canneal and blackscholes, are similar to streamcluster.

The composition results are close to direct measurement. We found similar accuracy for other thread groups. The benefit of composition is significant: instead of measuring different 4-thread groups 70 times (once for each group), shared footprint measures the 8-thread execution once and derives the 70 footprints. In fact, it derives the footprint for all thread groups, which is numbered $2^8-1=255$ for each program. The benefit increases exponentially as we analyze programs with more threads.

The benchmarks are grouped vertically for 3 types of parallelism: pipeline-parallel (ferret and dedup), task-parallel (facesim and bodytrack) and data-parallel (fluidanimate and streamcluster). We discover that these three categories also correspond to different degrees of thread symmetry. The data behavior is most asymmetrical among pipeline threads but most symmetrical among data-parallel threads.

Without compositional analysis, there was no effective way to check for thread symmetry or asymmetry, since it would require testing every thread group. As explained earlier, all group testing is flawed because thread behavior may change if run again. All group simulation is too expensive since the number of runs needed grows exponentially to the number of threads.

Section 7 Applications This section shows two exemplary uses made possible by the shared footprint

Section 7.1 Predicting Miss Ratio

Shared footprint can be converted to cache miss ratio as discussed in Section 5. We apply equation 3 to predict the cache miss ratio and present the accuracy of prediction in this section. We compare the miss ratios predicted from shared footprint with the results read from hardware counters. The following hardware events are measured [17]: MEM_INST_RETIRED.LOADS; MEM_INST_RETIRED.STORES; and OFECORE_RESPONSE_0.DATA_IN.L3_MISS (MSR Encoding: 0x7033)

The measured miss ratio is the ratio of the off-core event count divided by the sum of the memory instruction counts.

Figure 8:
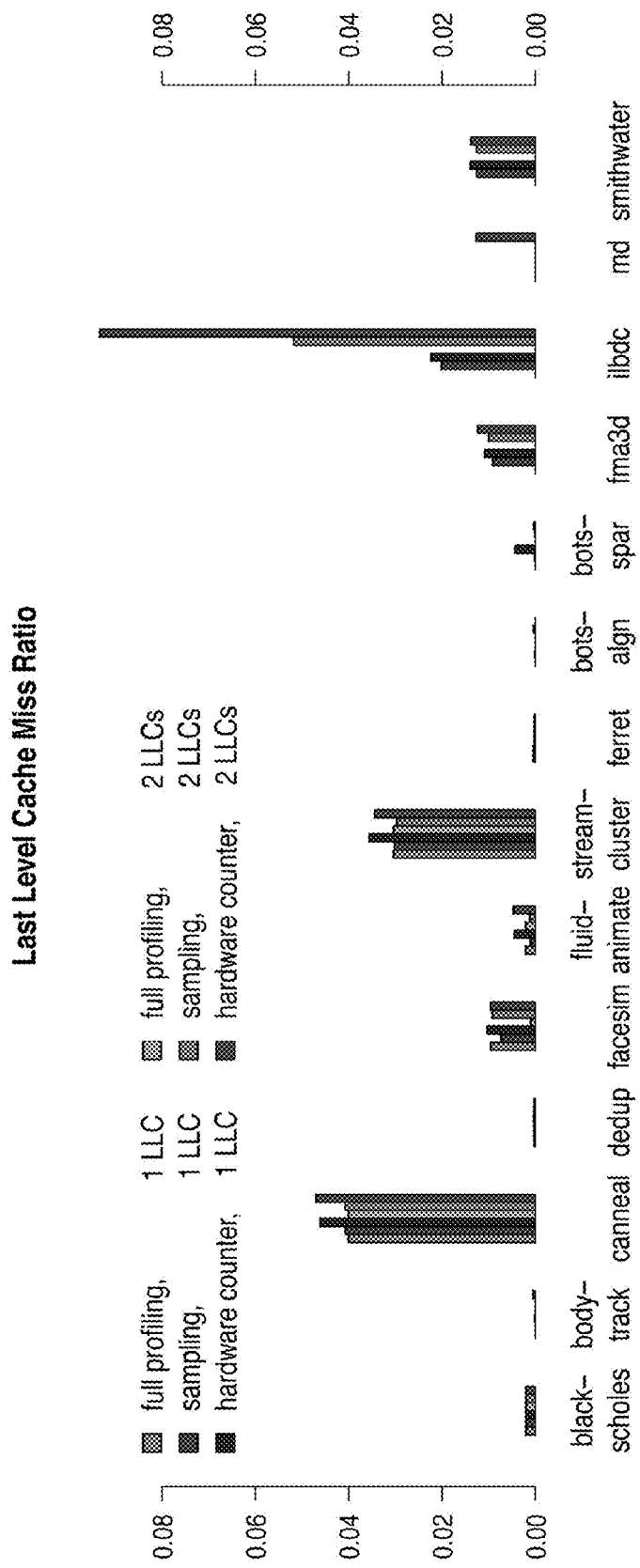
FIG. 8 is a bar graph showing a comparison of predicted and measured LLC miss ratio for 14 multi-threaded benchmarks.

The results are shown in FIG. 8 for 8-thread executions of 14 benchmarks selected from PARSEC and SPEC OMP. For applications with symmetric threads, we present the miss ratio of a single thread. All threads execute the same code. For applications with asymmetric threads, e.g. ferret and dedup, the miss ratio of the thread with the heaviest workload is presented. Other threads have a similar prediction accuracy. For PARSEC benchmarks, we applied the analysis both with and without sampling. Their running configurations are given in Table 6. For SPEC OMP benchmarks, we run only the sampling version on the ref input size (except ilbdc, which we run train size).

FIG. 8 shows a comparison of predicted and measured LLC miss ratio for 14 multi-threaded benchmarks. For each program, the first 3 bars (blue) are miss ratios for one LLC, while the next 3 bars (red) are miss ratios on two LLCs. Each LLC is 8 MB. Full-trace prediction is used for the first 8 programs.

As FIG. 8 shows, sampling analysis produces fairly accurate predictions in most cases, except for bots-spar with 1 LLC, and with 2 LLCs and fluid-animate with 1 LLC and 2 LLCs. The full-trace analysis is used for just the first 8 programs and gives similarly accurate prediction in 7 programs but not facesim at 2 LLCs. The reason is that shared footprint expresses the average behavior and does not capture phase behavior. Sampling is effective in addressing this problem, because the shared footprint is measured separately for different samples. As a result, sampling more accurately predicts the miss ratio of facesim at 2 LLCs. Note that facesim in FIG. 1 is different because it was tested on 12 MB LLCs. Its miss ratio on 1 or 2 8 MB LLCs is similar, so is its performance Sampling analysis predicts facesim fairly accurately. It is sufficient to capture the average footprint for most benchmarks.

Another possible source of error is in the composition. We found the composition is actually accurate, as we have evaluated in Section 6.4. The phase behavior is the main source of error for full-trace footprint analysis. Interestingly, Xiang et al. did not find it a problem when predicting the miss ratio for SPEC 2006 programs, even though those programs also have phases [35]. The different findings indicate a difference in the type of phase behavior in parallel code than in sequential code.

Section 7.2 Optimizing Thread-Core Mapping

It is beneficial to co-locate threads that share data. For example, a technique called faithful scheduling separately schedules threads from different applications [23]. Within the same application, there may still be too many threads to run on the same processor. It is a difficult task to find the best way to group threads since the number of possibilities grows exponentially with the number of threads. On the other hand, optimization may significantly improve performance, especially for programs with asymmetric threads like dedup.

Figure 9:
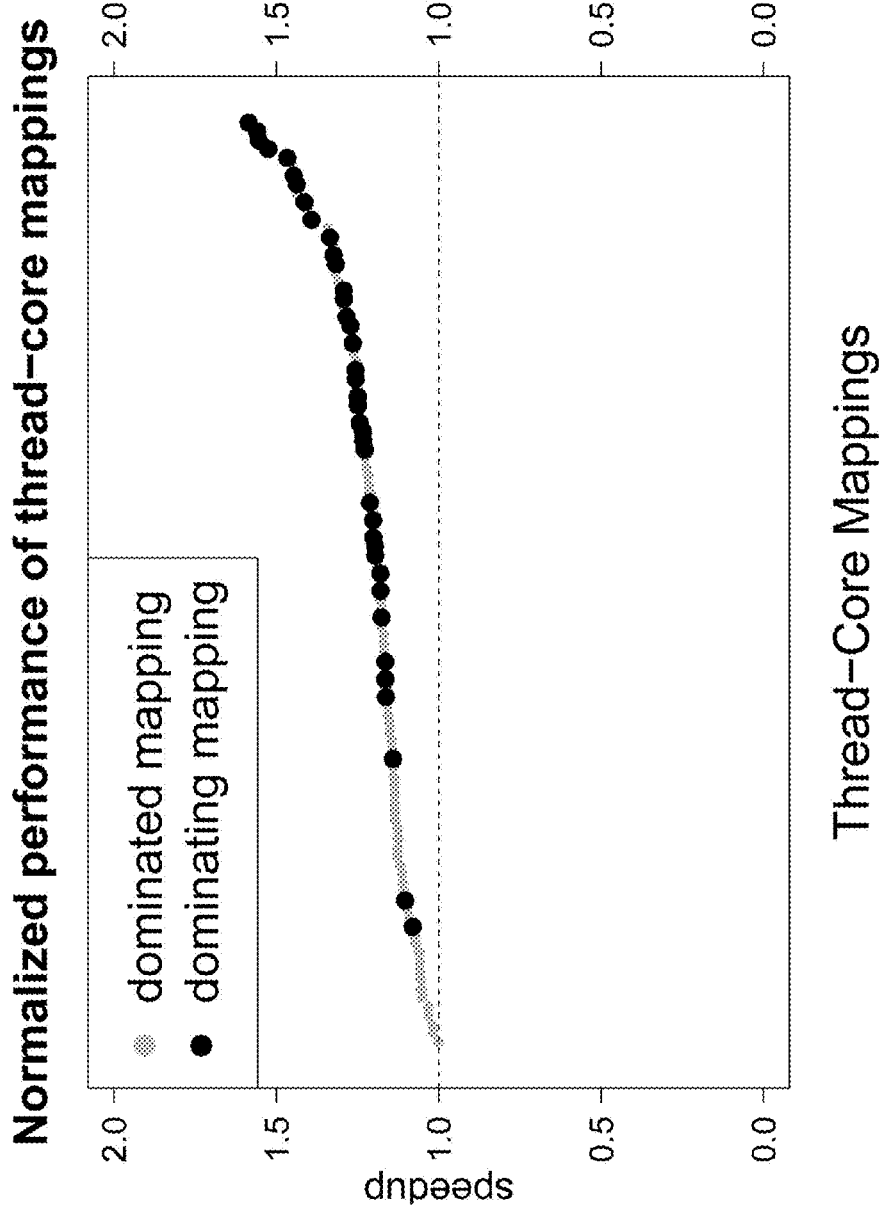
FIG. 9 is a graph showing the normalized speedups of thread-core mappings.

FIG. 9 shows that grouping dedup's threads differently can produce up to 60% performance difference. FIG. 9 shows the normalized speedups of thread-core mappings. The dots in the figure represent mappings sorted by their speedups over the worst mapping.

Finding the optimal thread-core mapping is not an easy task because the number of possible mappings grows exponentially with the thread count. Shared footprint analysis can serve as a model to quickly evaluate the cache performance of each mapping. In our model, we label each mapping with a vector of the last level cache miss ratios (one entry for one cache), which is composed from shared footprint analysis, and rank them based on their miss ratios. From the ranking, some mappings can be deemed as "inferior" to others, meaning they have higher miss ratios on all the target caches than some other mapping. We call them "dominated mappings" (the gray dots in FIG. 9) and the rest "dominating mappings" (the black dots in FIG. 9). We then focus on the dominating mappings and search for the best one within them. We experimented with this method on dedup with 8 threads on two shared caches. Our experiment showed that ⅔ of the mappings were identified as being dominated. From the remaining ⅓ mappings, exhaustive testing is used to find the optimal one. Compared to exhaustively testing all mappings, this method is 37% faster.

Section 8 Locality in Shared Cache: A Synthesis

Locality theory has two types of definitions: locality of individual accesses and locality of execution windows. The access locality is measured by the reuse distance, and the window locality by footprint. Locality analysis addresses two types of sharing: a parallel mix of sequential programs share the cache but not data, and a multi-threaded program shares both the cache and the data. We review the past studies on either type of sharing targeting either type of locality.

Reuse Distance in Shared Cache without Data Sharing

The first models were given by Suh et al. [27] for time-sharing systems and Chandra et al. [7] for multicore. Although different terminology was used, the common design is to compose the reuse distance of a program with the footprint of its peers, as explained by Xiang et al., who also showed that just mere reuse distance and (by inference) miss ratio are not composable [33]. Reuse distance is expensive to measure, although the cost can be reduced by sampling [24,36,3], OS and hardware support [38,6,28] and parallelization [24,22,8,15]. Recent theories use reuse time. CAPS and StatStack are first models to analyze shared cache entirely from reuse time, therefore with a linear-time complexity. In CAPS, the composition is based on distinct data blocks per cycle (DPC) [18]. In StatStack, the composition is done by first composing the private reuse time and then converting it to reuse distance [13]. Note that the naming in StatStack is different. Its reuse distance is our reuse time, and its stack distance is our reuse distance.

Footprint without Data Sharing

Denning and others established the working set theory for memory allocation [9]. Thiebaut and Stone defined footprint as a program's data in cache [29]. Falsafi and Wood redefined it to mean data blocks accessed by a program, so the data in cache is its "projection" [14]. Early studies used footprint to model interference in time-shared cache [29,1,14]. The footprint was measured for a single window length [29,14] or estimated for all lengths [27,7], including the working set theory (property P2 in [10]) in 1972 and recently DPC in CAPS [18]. Xiang et al. gave a linear-time algorithm to precisely measure the footprint for all-length windows [34]. Their higher-order theory (HOTL) can convert between footprint and reuse distance [35], so the footprint models are now as efficient as CAPS and StatStack.

Shared footprint solves the more difficult problem than Xiang et al. [34], because it measures not just the footprint but also the number of sharers. It subsumes the previous solution, which is now a sub-case, i.e. $sfp_1$. Furthermore, shared footprint gives the read-only and read-write footprint for sequential applications as it does for parallel code.

Concurrent Reuse Distance

Early studies focus on common patterns of data sharing seen at the system/hardware level [2,12]. They did not account for all manners of data sharing, nor for the aggregate effect. Other studies use simulation, and the results are cache specific [30,5].

Recent solutions developed the concept of concurrent reuse distance [19,11,31,32], also called multicore reuse distance [24]. Concurrent reuse distance gives the shared cache performance for all cache sizes. The miss-ratio prediction is accurate and not affected by phase behavior (unlike shared footprint). Data sharing is modeled by first measuring the amount of shared data between threads in the entire run and then inferring its effect in smaller windows through probabilistic models [19,11]. For loop-based code, Wu and Yeung developed scaling models to predict the concurrent and private reuse distances (CRD/PRD) profiles for different thread counts and data input sizes [31]. They used the model to study the scalability of multicore cache hierarchies, to separate the shared cache locality into interference-based and sharing-based components, and to construct a new profile type to model the effect of cluster caches [32].

Reuse distance considers the accesses from multiple threads together. It focuses data reuse rather than data sharing. It does not measure the number of sharers.

Shared Footprint

Falsafi and Wood gave a simple model of sharing where all processes share the same footprint, measured for a single window-length [14]. Shared footprint in this technical report measures it for all window-lengths. More importantly, it counts the number of threads accessing the same data, adding a new type of locality-the thread-count locality. Thread-count locality is used for thread-group composition. In addition, it is necessary to derive metrics of effective cache size and cache sharing spectrum (See section 5). The former is used for understanding performance scaling on multicore, while the latter is used for cache analysis since it shows precisely how interleaving, program input, and other factors affect data sharing in cache.

Thread-count locality in this work extends both window- and access-based locality, for the first time making both types of metrics composable for multi-threaded code. We have shown this in composing thread-group footprint (See section 6.4) and thread-group miss ratio (See section 7.1). Both are new and impossible with previous techniques.

Section 9

Summary

We have defined shared footprint hereinabove as a collection of metrics parameterized by the number of sharers, thread groups, access types, and by derivation, cache of all sizes. We have developed a linear-time algorithm to measure these metrics in a single pass. The efficiency is further improved by parallelization and sampling. We have measured and analyzed data sharing in 14 multi-threaded applications from PARSEC and SPEC OMP, including sharing spectrum, effect of interleaving, and optimization of thread-core mapping to improve performance by up to 60%. Shared footprint adds the missing piece in the locality theory and augments of previous theories of reuse distance and footprint to use thread count, thread composition and access-type analysis.

Figure 10:
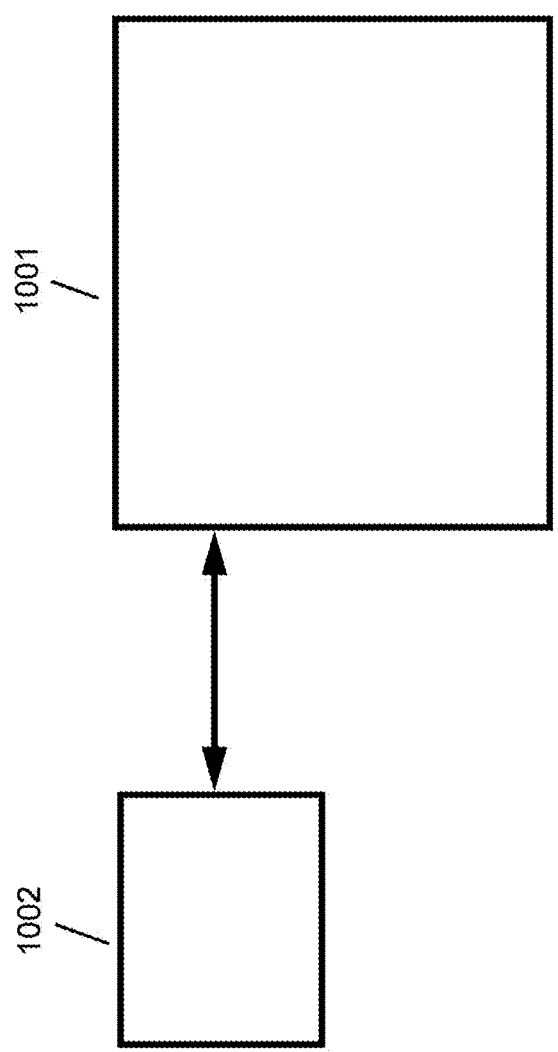
FIG. 10 shows a simplified block diagram of a computer system to quantify a plurality of digital data sharing in a multi-threaded execution.

FIG. 10 shows a simplified block diagram of a computer system to quantify a plurality of digital data sharing in a multi-threaded execution. A computer readable non-transitory storage medium 1002 including a computer readable multi-threaded executable code configured to run on the at least one computer processor and a computer readable executable code configured to calculate a plurality of shared footprint values and an average shared footprint value. At least one computer processor 1001 is configured to run the multi-threaded executable code. It will be understood by those skilled in the art that the at least one computer processor 1001 and/or the computer readable non-transitory storage medium 1002 would typically be communicatively coupled to another computer system (not shown in FIG. 10), having a processor running any suitable operating system (OS) such as, for example, a workstation, PC, LINUX computer, desktop computer, tablet, etc. for purposes of displaying, printing, or otherwise post processing one or more shared footprint values and/or an averaged shared footprint value.

Figure 11:
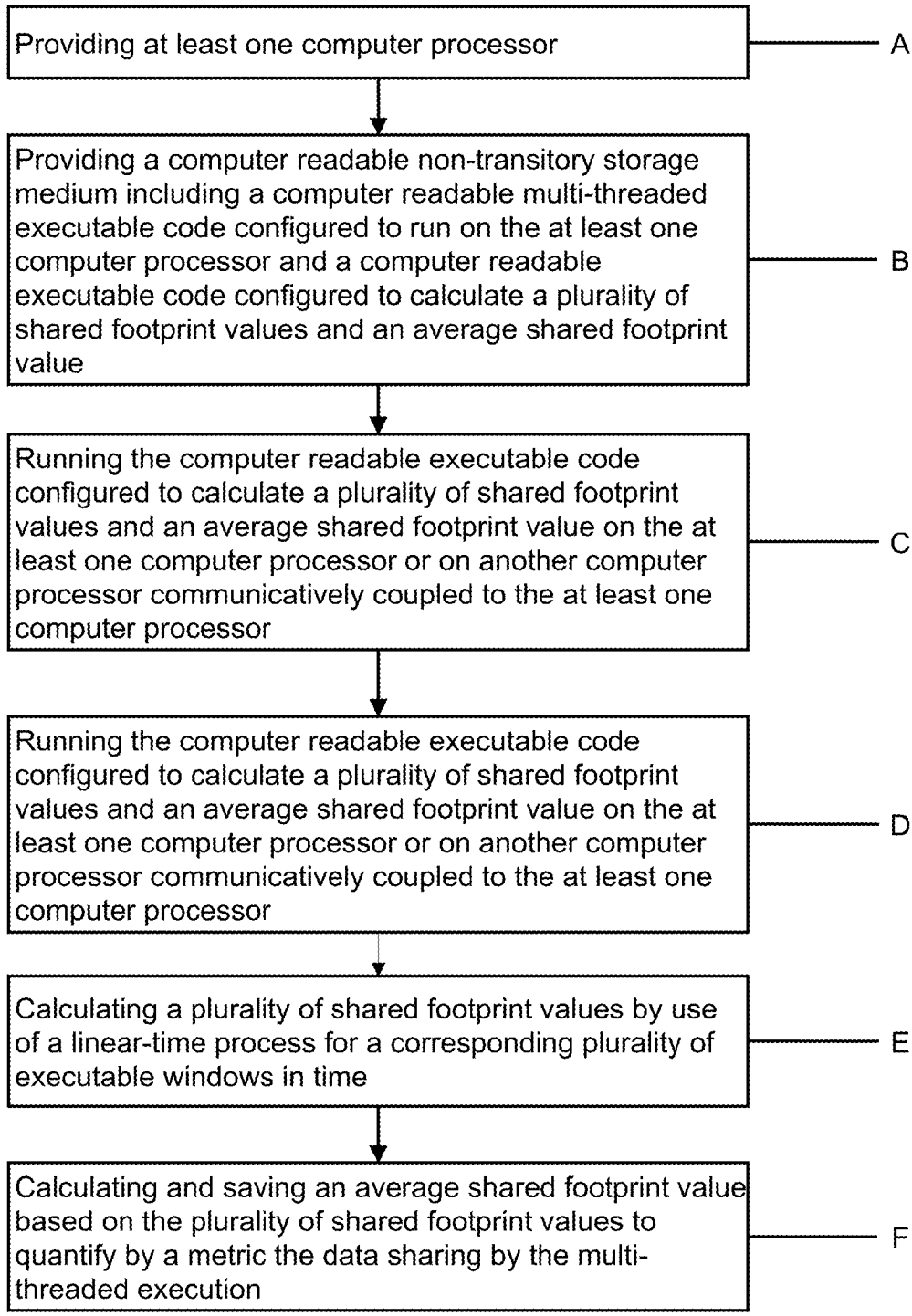
FIG. 11 shows a block diagram of an exemplary embodiment of a method to quantify a plurality of digital data sharing in a multi-threaded execution.

Also in summary, FIG. 11 shows a block diagram of one exemplary embodiment of a method to quantify a plurality of digital data sharing in a multi-threaded execution includes the steps of: A) providing at least one computer processor; B) providing a computer readable non-transitory storage medium including a computer readable multi-threaded executable code configured to run on the at least one computer processor and a computer readable executable code configured to calculate a plurality of shared footprint values and an average shared footprint value; C) running the multi-threaded executable code on the at least one computer processor; D) running the computer readable executable code configured to calculate a plurality of shared footprint values and an average shared footprint value on the at least one computer processor or on another computer processor communicatively coupled to the at least one computer processor; E) calculating a plurality of shared footprint values by use of a linear-time process for a corresponding plurality of executable windows in time; and F) calculating and saving an average shared footprint value based on the plurality of shared footprint values to quantify by a metric the data sharing by the multi-threaded execution.

A computer readable executable code configured to calculate a plurality of shared footprint values and an average shared footprint value on the at least one computer processor or on another computer processor can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] Anant Agarwal, Mark Horowitz, and John L. Hennessy. An analytical cache model. ACM Transactions on Computer Systems, 7(2):184-215, 1989.

[2] John K. Bennett, John B. Carter, and Willy Zwaenepoel. Adaptive software cache management for distributed shared memory architectures. In Proceedings of ISCA, pages 125-134, 1990.

[3] Kristof Beyls and Erik H. D'Hollander. Discovery of locality-improving refactoring by reuse path analysis. In Proceedings of High Performance Computing and Communications. Springer. Lecture Notes in Computer Science, volume 4208, pages 220-229, 2006.

[4] Christian Bienia, Sanjeev Kumar, Jaswinder Pal Singh, and Kai Li. The PARSEC benchmark suite: characterization and architectural implications. In Proceedings of PACT, pages 72-81, 2008.

[5] Christian Bienia and Kai Li. Fidelity and scaling of the PARSEC benchmark inputs. In Proceedings of the 2010 International Symposium on Workload Characterization, December 2010.

[6] Calin Cascaval, Evelyn Duesterwald, Peter F. Sweeney, and Robert W. Wisniewski. Multiple page size modeling and optimization. In Proceedings of PACT, pages 339-349, 2005.

[7] Dhruba Chandra, Fei Guo, Seongbeom Kim, and Yan Solihin Predicting inter-thread cache contention on a chip multi-processor architecture. In Proceedings of HPCA, pages 340-351, 2005.

[8] Huimin Cui, Qing Yi, Jingling Xue, Lei Wang, Yang Yang, and Xiaobing Feng. A highly parallel reuse distance analysis algorithm on gpus. In Proceedings of IPDPS, 2012.

[9] Peter J. Denning. Working sets past and present. IEEE Transactions on Software Engineering, SE-6(1), January 1980.

[10] Peter J. Denning and Stuart C. Schwartz. Properties of the working set model. Communications of the ACM, 15(3):191-198, 1972.

[11] Chen Ding and Trishul Chilimbi. A composable model for analyzing locality of multi-threaded programs. Technical Report MSR-TR-2009-107, Microsoft Research, August 2009.

[12] Susan J. Eggers and Randy H. Katz. A characterization of sharing in parallel programs and its application to coherency protocol evaluation. In Proceedings of ISCA, pages 373-382, 1988.

[13] David Eklov, David Black-Schaer, and Erik Hagersten. Fast modeling of shared caches in multicore systems. In Proceedings of HiPEAC, pages 147-157, 2011. Best paper.

[14] Babak Falsa and David A. Wood. Modeling cost/performance of a parallel computer simulator. ACM Transactions on Modeling and Computer Simulation, 7(1):104-130, 1997.

[15] Saurabh Gupta, Ping Xiang, Yi Yang, and Huiyang Zhou. Locality principle revisited: A probability-based quantitative approach. In Proceedings of IPDPS, 2012.

[16] Mark D. Hill and Alan Jay Smith. Evaluating associativity in CPU caches. IEEE Transactions on Computers, 38(12):1612-1630, 1989.

[17] Intel Corporation. Intel R64 and IA-32 Architectures Software Developer's Manual. Number 325462-051US. June 2014.

[18] Yunlian Jiang, Kai Tian, and Xipeng Shen. Combining locality analysis with online proactive job co-scheduling in chip multiprocessors. In Proceedings of HiPEAC, pages 201-215, 2010.

[19] Yunlian Jiang, Eddy Z. Zhang, Kai Tian, and Xipeng Shen. Is reuse distance applicable to data locality analysis on chip multiprocessors? In Proceedings of CC, pages 264-282, 2010

[20] Chi-Keung Luk, Robert S. Cohn, Robert Muth, Harish Patil, Artur Klauser, P. Georey Lowney, Steven Wallace, Vijay Janapa Reddi, and Kim M. Hazelwood. Pin: building customized program analysis tools with dynamic instrumentation. In Proceedings of PLDI, pages 190-200, 2005.

[21] R. L. Mattson, J. Gecsei, D. Slutz, and I. L. Traiger. Evaluation techniques for storage hierarchies. IBM System Journal, 9(2):78-117, 1970.

[22] Qingpeng Niu, James Dinan, Qingda Lu, and P. Sadayappan. PARDA: A fast parallel reuse distance analysis algorithm. In Proceedings of IPDPS, 2012.

[23] Kishore Kumar Pusukuri, Rajiv Gupta, and Laxmi N. Bhuyan. No more backstabbing . . . a faithful scheduling policy for multithreaded programs. In Proceedings of PACT, pages 12-21, 2011.

[24] Derek L. Schu, Milind Kulkarni, and Vijay S. Pai. Accelerating multicore reuse distance analysis with sampling and parallelization. In Proceedings of PACT, pages 53-64, 2010.

[25] Rathijit Sen and David A. Wood. Reuse-based online models for caches. In Proceedings of SIGMETRICS, pages 279-292, 2013.

[26] A. J. Smith. On the effectiveness of set associative page mapping and its applications in main memory management. In Proceedings of ICSE, 1976.

[27] G. Edward Suh, Srinivas Devadas, and Larry Rudolph. Analytical cache models with applications to cache partitioning. In Proceedings of ICS, pages 1-12, 2001.

[28] David K. Tam, Reza Azimi, Livio Soares, and Michael Stumm RapidMRC: approximating L2 miss rate curves on commodity systems for online optimizations. In Proceedings of ASPLOS, pages 121-132, 2009.

[29] Dominique Thiebaut and Harold S. Stone. Footprints in the cache. ACM Transactions on Computer Systems, 5(4):305-329, 1987.

[30] Steven Cameron Woo, Moriyoshi Ohara, Evan Tonic, Jaswinder Pal Singh, and Anoop Gupta. The SPLASH-2 Programs: Characterization and Methodological Considerations. The 22nd annual international symposium on Computer architecture (ISCA '95), pages 24-36, 1995.

[31] Meng-Ju Wu and Donald Yeung. Coherent profiles: Enabling efficient reuse distance analysis of multicore scaling for loop-based parallel programs. In Proceedings of PACT, pages 264-275, 2011.

[32] Meng-Ju Wu, Minshu Zhao, and Donald Yeung. Studying multicore processor scalingvia reuse distance analysis. In Proceedings of ISCA, pages 499-510, 2013.

[33] Xiaoya Xiang, Bin Bao, Tongxin Bai, Chen Ding, and Trishul M. Chilimbi. All-window profiling and composable models of cache sharing. In Proceedings of PPoPP, pages 91-102, 2011.

[34] Xiaoya Xiang, Bin Bao, Chen Ding, and Yaoqing Gao. Linear-time modeling of program working set in shared cache. In Proceedings of PACT, pages 350-360, 2011.

[35] Xiaoya Xiang, Chen Ding, Hao Luo, and Bin Bao. HOTL: a higher order theory of locality. In Proceedings of ASPLOS, pages 343-356, 2013.

[36] Yutao Zhong and Wentao Chang. Sampling-based program locality approximation. In Proceedings of ISMM, pages 91-100, 2008.

[37] Yutao Zhong, Xipeng Shen, and Chen Ding. Program locality analysis using reuse distance. ACM TOPLAS, 31(6):1-39, August 2009.

[38] Pin Zhou, Vivek Pandey, Jagadeesan Sundaresan, Anand Raghuraman, Yuanyuan Zhou, and Sanjeev Kumar. Dynamic tracking of page miss ratio curve for memory management. In Proceedings of ASPLOS, pages 177-188, 2004.

What is claimed is:

1. A method to quantify a plurality of digital data sharing in a multi-threaded execution comprising the steps of:
providing a computer readable non-transitory storage medium comprising a computer readable multi-threaded executable code to run on at least one computer processor and a computer readable executable code configured to calculate a plurality of shared footprint values and an average shared footprint value;
running said multi-threaded executable code on said at least one computer processor;
running said computer readable executable code configured to calculate a plurality of shared footprint values and an average shared footprint value on said at least one computer processor or on another computer processor communicatively coupled to said at least one computer processor;
calculating a plurality of shared footprint values of data shared by a plurality of threads of a multi-threaded execution by use of a linear-time process for a corresponding plurality of executable windows in time;
calculating and saving an average shared footprint value based on said plurality of shared footprint values to quantify by a metric of said data sharing by said multi-threaded execution; and
wherein each sharer footprint comprises an equation:

$$sfpk+([i, j])=|\{d \in D | d \text{ is used by at least k threads in } [i, j]\}|.$$

2. The method of claim 1, wherein said multi-threaded execution comprises a trace from a multi-threaded program and each of said plurality of digital data sharing comprises a datum in a memory cell.

3. The method of claim 1, wherein said at least one computer processor comprises at least one multi-core processor.

4. The method of claim 1, wherein said average shared footprint comprises an average of sharer footprints.

5. The method of claim 4, wherein said average shared footprint value comprises an equation:

$$\overline{sfp_{k+}}(l) = \frac{\text{sum of } k+ \text{sharers footprints in length-}l \text{ windows}}{\text{number of length-}l \text{ windows}}$$

$$= \sum_{i=1}^{N-l+1} \frac{sfp_{k+}([i, i+l-1])}{N-l+1}.$$

6. The method of claim 4, wherein said average of sharer footprints is calculated by an equation:

$$\overline{sfp_{k+}}(l) = |D_{k+}| - \frac{\sum_{d \in D_{k+}} \sum_{i=1}^{N} [SI_k^d(i) - SS_{k-1}^d(i)](i-l+1)^+}{N-l+1}$$

$$= |D_{k+}| = \frac{\sum_{i=1}^{N} \sum_{d \in D_{k+}} [i \cdot SI_k^d(i) - i \cdot SS_{k-1}^d(i)]}{N-l+1} +$$

$$\frac{\sum_{i=l}^{N} \sum_{d \in D_{k+}} [SI_k^d(i) - SS_{k-1}^d(i)](l-1)}{N-l+1}$$

$$= |D_{k+}| - \frac{\sum_{i=l}^{N} [i \cdot SI_k(i) - i \cdot SS_{k-1}(i)]}{N-l+1} +$$

$$\frac{\sum_{i=l}^{N} [SI_k(i) - SS_{k-1}(i)](l-1)}{N-l+1}.$$

7. The method of claim 1, wherein said method to quantify a plurality of digital data sharing further comprises an analysis and optimization of a multi-threaded computer program.

8. The method of claim 7, wherein said analysis and optimization is further used to improve a run-time performance of said multi-threaded computer program configured to run on one or more multi-core processors.

9. The method of claim 1, wherein said method to quantify a plurality of digital data sharing further comprises a sharing pattern analysis.

10. The method of claim 1, wherein said method to quantify a plurality of digital data sharing further comprises a false sharing analysis.

11. The method of claim 1, wherein said method to quantify a plurality of digital data sharing further comprises an effective cache scaling analysis.

12. The method of claim 1, wherein said method to quantify a plurality of digital data sharing completes in a single pass over an interleaved execution trace.

13. The method of claim 1, wherein said method to quantify a plurality of digital data sharing further comprises determining a miss ratio prediction based on said shared footprint values.

14. The method of claim 1, wherein said method to quantify a plurality of digital data sharing further comprises determining an optimization of thread-core mapping based on said shared footprint values.

15. A method to quantify a plurality of digital data sharing for sequences of uses of objects comprising the steps of:
providing a computer readable non-transitory storage medium comprising a computer readable sequence of uses of objects and a computer readable executable code to run on at least one computer processor to calculate a plurality of shared footprint values and an average shared footprint value;
running said computer readable executable code configured to calculate a plurality of shared footprint values and an average shared footprint value on said at least one computer processor or on another computer processor communicatively coupled to said at least one computer processor;
calculating a plurality of shared footprint values of a plurality of sequences of uses of objects by use of a linear-time process for a corresponding plurality of executable windows in time;
calculating and saving an average shared footprint value based on said plurality of shared footprint values to quantify by a metric of said sequences of uses of objects; and
wherein each sharer footprint comprises an equation:

$sfpk+([i, j])=|\{d \in D | d \text{ is used by at least k threads in } [i, j]\}|.$ 16. The method of claim 15, wherein said sequences of uses of objects comprise sequences of actions or sequences of uses of data.

17. The method of claim 15, wherein said sequences of uses of objects comprise multiple streams of data requests.

18. A computer system to quantify a plurality of digital data sharing in a multithreaded execution comprising:
a computer readable non-transitory storage medium comprising a computer readable multi-threaded executable code configured to run on said at least one computer processor and a computer readable executable code configured to calculate a plurality of shared footprint values and an average shared footprint value;
at least one computer processor configured to run said multi-threaded executable code, said computer readable executable code configured to calculate a plurality of shared footprint values and an average shared footprint value also running on said at least one computer processor or said computer readable executable code configured to calculate a plurality of shared footprint values and an average shared footprint value running on another computer communicatively coupled to said at least one computer processor, said computer readable executable code configured to calculate a plurality of shared footprint values and an average shared footprint value, to calculate a plurality of shared footprint values of data shared by a plurality of threads of a multi-threaded execution for a corresponding plurality of executable windows in time, and to calculate and save an average shared footprint value based on said plurality of shared footprint values to quantify by a metric of said data sharing by said multi-threaded execution; and
wherein, each sharer footprint comprises an equation:

$sfpk+([i, j])=|\{d \in D | d \text{ is used by at least k threads in } [i, j]\}|.$ 19. A computer system that quantifies a plurality of digital data sharing in a multi-threaded execution comprising:
a memory unit that stores a multi-threaded executable code;
at least one computer processor communicatively coupled to said memory unit and configured to run said multi-threaded executable code;
a shared footprint process for calculating a plurality of shared footprint values and an average shared footprint value of at least one run of said multi-threaded executable code, said shared footprint process running on said at least one computer or on another computer, said shared footprint process configured to calculate a plurality of shared footprint values and an average shared footprint value, to calculate a plurality of shared footprint values of data shared by a plurality of threads of a multi-threaded execution for a corresponding plurality of executable windows in time, and to calculate and save an average shared footprint value based on said plurality of shared footprint values to quantify by a metric of said data sharing by said multi-threaded execution; and wherein each sharer footprint comprises an equation:

$sfpk+([i, j]) = |\{d \in D | d \text{ is used by at least k threads in } [i, j]\}|$.

* * * * *